(12) United States Patent
Nishimoto et al.

(10) Patent No.: US 9,638,115 B2
(45) Date of Patent: May 2, 2017

(54) METHOD AND DEVICE FOR CONTROLLING MULTI-CYLINDER ENGINE

(71) Applicant: Mazda Motor Corporation, Aki-gun, Hiroshima (JP)

(72) Inventors: Toshiaki Nishimoto, Hiroshima (JP); Hisashi Okazawa, Hiroshima (JP); Masanori Hashimoto, Hiroshima (JP); Junsou Sasaki, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 163 days.

(21) Appl. No.: 14/460,294

(22) Filed: Aug. 14, 2014

(65) Prior Publication Data

US 2015/0053175 A1 Feb. 26, 2015

(30) Foreign Application Priority Data

Aug. 22, 2013 (JP) ................................. 2013-172193

(51) Int. Cl.
| | |
|---|---|
| *F02D 31/00* | (2006.01) |
| *F01M 1/02* | (2006.01) |
| *F02B 75/18* | (2006.01) |
| *F02D 29/04* | (2006.01) |

(Continued)

(52) U.S. Cl.
CPC ............ *F02D 31/001* (2013.01); *F01M 1/02* (2013.01); *F02B 75/18* (2013.01);
(Continued)

(58) Field of Classification Search
CPC ............. F02D 13/0207; F02D 41/1498; F02D 41/0087; F02D 41/0002; F02D 13/0219;
(Continued)

(56) References Cited

U.S. PATENT DOCUMENTS

| | | | | |
|---|---|---|---|---|
| 4,111,165 A | * | 9/1978 | Aoyama ............. | F01L 13/0031 123/90.15 |
| 4,114,643 A | * | 9/1978 | Aoyama ............. | F01L 13/0031 123/321 |

(Continued)

FOREIGN PATENT DOCUMENTS

JP 08270491 A 10/1996

*Primary Examiner* — Joseph Dallo
(74) *Attorney, Agent, or Firm* — Alleman Hall McCoy Russell & Tuttle LLP

(57) ABSTRACT

A control device of a multi-cylinder engine is provided. The device includes first and second auxiliary components. The first auxiliary component generates energy. The device includes an angular speed variation detecting device for detecting an angular speed variation of a crankshaft, and an auxiliary component control device for controlling drive loads of the first and second auxiliary components. When an engine load is low and the angular speed variation exceeds a predetermined threshold, the auxiliary component control device increases a total drive load of the auxiliary components. Here, if the drive load of the first auxiliary component is increasable, the drive load of the first auxiliary component is increased, and when this increase amount is insufficient, the drive load of the second auxiliary component is increased, whereas if the drive load of the first auxiliary component is not increasable, the drive load of the second auxiliary component is increased.

3 Claims, 13 Drawing Sheets

(51) Int. Cl.
*F02D 29/06* (2006.01)
*F02D 41/14* (2006.01)
*F02D 41/00* (2006.01)
*F02D 13/02* (2006.01)
*F02D 13/06* (2006.01)
*F02D 41/08* (2006.01)
*F01L 1/344* (2006.01)
*F01L 13/00* (2006.01)
*F01L 1/053* (2006.01)

(52) U.S. Cl.
CPC ......... *F02D 13/0219* (2013.01); *F02D 13/06* (2013.01); *F02D 29/04* (2013.01); *F02D 29/06* (2013.01); *F02D 41/0087* (2013.01); *F02D 41/1401* (2013.01); *F02D 41/1498* (2013.01); *F01L 1/344* (2013.01); *F01L 1/3442* (2013.01); *F01L 13/0005* (2013.01); *F01L 2001/0537* (2013.01); *F01L 2013/001* (2013.01); *F02D 13/0261* (2013.01); *F02D 41/083* (2013.01); *F02D 2041/0012* (2013.01); *F02D 2250/24* (2013.01); *Y02T 10/18* (2013.01)

(58) Field of Classification Search
CPC ..... F02D 13/06; F01L 1/2405; F01L 13/0005; F01L 2800/00; F01L 2013/001; F01L 1/3442; F01L 2820/042; Y02T 10/42; Y02T 10/18

USPC ............. 123/90.12, 90.15, 90.17, 90.55, 321
See application file for complete search history.

(56) References Cited

U.S. PATENT DOCUMENTS

| | | | | |
|---|---|---|---|---|
| 4,592,323 | A * | 6/1986 | Vest | B61C 9/24 123/196 AB |
| 5,156,119 | A * | 10/1992 | Suga | F01L 1/352 123/90.17 |
| 5,247,914 | A * | 9/1993 | Imai | F01L 1/34406 123/198 C |
| 6,488,479 | B1 * | 12/2002 | Berger | F01M 1/16 123/196 R |
| 2005/0066932 | A1 * | 3/2005 | Patterson | F02D 17/02 123/198 F |
| 2005/0129528 | A1 * | 6/2005 | Hunter | F01C 11/002 417/199.1 |
| 2006/0065217 | A1 * | 3/2006 | Ikegawa | F01M 1/02 123/41.42 |
| 2007/0261656 | A1 * | 11/2007 | Albertson | B60W 10/06 123/192.1 |
| 2009/0107451 | A1 * | 4/2009 | Bochart | F01M 1/16 123/196 R |
| 2010/0292850 | A1 * | 11/2010 | Kuah | F01M 1/16 700/282 |

* cited by examiner

METHOD AND DEVICE FOR CONTROLLING MULTI-CYLINDER ENGINE

BACKGROUND

The present invention relates to method and device for controlling a multi-cylinder engine.

Conventionally, an art for suppressing an engine torque variation in idling of an engine is known. For example, JP1996-270491A discloses a speed control device of an engine which feedback-controls an idle speed with an ISC valve (idle speed control valve). The speed control device is provided with an auxiliary component load air amount control valve which controls a discharge pressure of a pump for auxiliary component load to change an intake air amount. The speed control device suppresses a variation of the idle speed due to an auxiliary component load variation, by estimating an air amount passing through the auxiliary component load air amount control valve and controlling an operation amount of the ISC valve according to a change amount of the passing air amount per unit time.

Meanwhile, with a multi-cylinder engine, when a total operation period of time of the engine becomes long, in a low engine load state (e.g., in idling), there is a possibility that the engine torque varies due to variations in performance of an ignition system and a fuel supply system of each cylinder and a valve operating system. Such a variation of the engine torque causes an increase of the engine vibration.

Thus, it can be considered to increase the idle speed so as to suppress the engine torque variation as disclosed in JP1996-270491A; however, by simply increasing the idle speed, a fuel consumption amount increases.

SUMMARY

The present invention is made in view of the above situations and aims to suppress a variation of a torque of a multi-cylinder engine by suppressing degradation of a fuel consumption as much as possible in a low engine load state where an engine load of the multi-cylinder engine is lower than a predetermined value.

According to one aspect of the invention, a control device of a multi-cylinder engine is provided. The control device includes first and second auxiliary components driven by the multi-cylinder engine installed in a vehicle. The first auxiliary component generates a required energy of a device installed in the vehicle. The control device of the multi-cylinder engine includes an angular speed variation detecting device for detecting an angular speed variation of a crankshaft of the engine, and an auxiliary component control device for controlling drive loads of the first and second auxiliary components. When an engine load is lower than a predetermined value and the angular speed variation detected by the angular speed variation detecting device exceeds a predetermined threshold, the auxiliary component control device performs an auxiliary component drive load increase control in which a total drive load of the first and second auxiliary components is increased by a predetermined amount to reduce the angular speed variation to be lower than the predetermined threshold. In the auxiliary component drive load increase control, when increasing the total drive load of the first and second auxiliary components by the predetermined amount, in a state where the drive load of the first auxiliary component is increasable, the drive load of the first auxiliary component is preferentially increased, and when the increase amount of the drive load of the first auxiliary component is insufficient to cover the predetermined amount, the drive load of the second auxiliary component is increased, whereas in a state where the drive load of the first auxiliary component is not increasable, the drive load of the second auxiliary component is increased without increasing the drive load of the first auxiliary component.

With the above configuration, when the angular speed variation of the crankshaft exceeds the predetermined threshold, since the total drive load of the first and second auxiliary components is increased (the current drive load of at least one of the auxiliary components may be zero in this situation) by the predetermined amount, the engine load is increased and a variation of an engine torque can be suppressed. Further, when increasing the total drive load of the first and second auxiliary components by the predetermined amount, in the state where the drive load of the first auxiliary component is increasable, since the drive load of the first auxiliary component is preferentially increased, the engine output can be effectively utilized as an energy source of the device installed in the vehicle. Therefore, degradation of a fuel consumption caused by suppressing the engine torque variation can be suppressed as much as possible.

With the control device of the multi-cylinder engine, the first auxiliary component may be a generator for generating power as the required energy.

Thus, the power generated by the generator can be effectively utilized in the device (a battery or an electric component) installed in the vehicle.

With the control device of the multi-cylinder engine, the second auxiliary component may be a variable displacement oil pump for supplying oil to a part of the engine to be lubricated and a hydraulically-actuated device via a hydraulic path.

Thus, the drive load of the second auxiliary component can easily be increased and stably be controlled.

In the case where the second auxiliary component is the variable displacement oil pump, the control device preferably also includes an oil pressure detecting device for detecting an oil pressure within the hydraulic path. The auxiliary component control device preferably includes a pump control device for controlling a discharge amount of the oil pump so that the oil pressure detected by the oil pressure detecting device reaches a target oil pressure predetermined according to the operating state of the engine.

Thus, in any operating state of the engine, the fuel consumption performance can be improved by suitably adjusting the drive load of the oil pump while securing an operating oil pressure of the hydraulically-actuated device. Moreover, in the auxiliary drive load increase control, when increasing the drive load of the oil pump, by increasing the target oil pressure, the discharge amount of the oil pump is increased. Thus, the drive load of the oil pump can easily be increased.

According to another aspect of the present invention, a method of controlling a multi-cylinder engine installed in a vehicle is provided. A first auxiliary component driven by the engine and for generating a required energy of a device installed in the vehicle, a second auxiliary component driven by the engine, and an angular speed variation detecting device for detecting an angular speed variation of a crankshaft of the engine are provided in the vehicle. The method includes increasing, when an engine load is lower than a predetermined value and the angular speed variation detected by the angular speed variation detecting device exceeds a predetermined threshold, a total drive load of the first and second auxiliary components by a predetermined amount to reduce the angular speed variation to be lower than the predetermined threshold. When increasing the total drive load of the first and second auxiliary components by the predetermined amount, in the state where the drive load of the first auxiliary component is increasable, the drive load of the first auxiliary component is preferentially increased, and when the increase amount of the drive load of the first auxiliary component is insufficient to cover the predetermined amount, the drive load of the second auxiliary component is increased, whereas in the state where the drive load of the first auxiliary component is not increasable, the drive load of the second auxiliary component is increased without increasing the drive load of the first auxiliary component.

With the above method, similarly to the control device of the multi-cylinder engine, the degradation of the fuel consumption caused by suppressing the engine torque variation can be suppressed as much as possible.

With the method of controlling the multi-cylinder engine, the first auxiliary component may be a generator for generating power as the required energy. The second auxiliary component may be a variable displacement oil pump for supplying oil to a part of the engine to be lubricated and a hydraulically-actuated device via an oil pressure path.

Thus, the power generated by the generator can be effectively utilized in the device (a battery or an electric component) installed in the vehicle, and the drive load of the second auxiliary component can easily be increased and stably be controlled.

DETAILED DESCRIPTION OF EMBODIMENT

Hereinafter, an embodiment of the present invention is described in detail with reference to the appended drawings.

Figure 1:
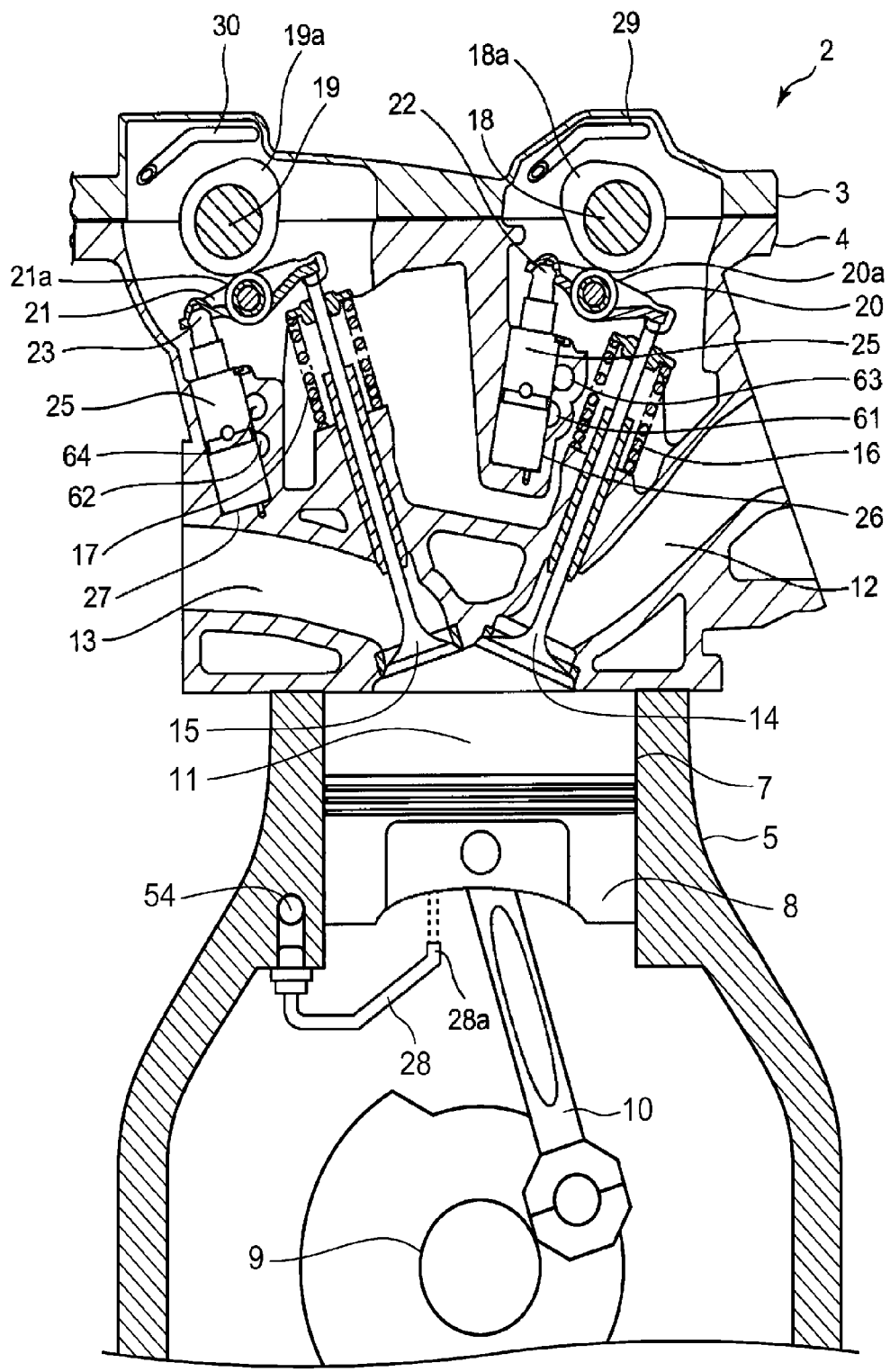
FIG. 1 is a cross-sectional view illustrating a schematic configuration of a multi-cylinder engine controlled by a control device (or a control method) according to an embodiment of the present invention.

FIG. 1 illustrates a multi-cylinder engine 2 (hereinafter, simply referred to as the engine 2) controlled by a control device (or a control method) according to this embodiment of the present invention. The engine 2 is an inline four-cylinder gasoline engine in which first to fourth cylinders are aligned in this order in a direction perpendicular to the paper sheet of FIG. 1, and is installed in a vehicle, such as an automobile. In the engine 2, cam caps 3, a cylinder head 4, a cylinder block 5, a crank case (not illustrated), and an oil pan 6 (see FIG. 4) are coupled in up-and-down directions, pistons 8 that are respectively reciprocatable within four cylinder bores 7 formed in the cylinder block 5 are coupled by connecting rods 10 to a crankshaft 9 that is rotatably supported by the crank case, and combustion chambers 11 are formed, one for each cylinder by the cylinder bore 7 of the cylinder block 5, the piston 8, and the cylinder head 4.

Intake ports 12 and exhaust ports 13 opening to the combustion chambers 11 are formed in the cylinder head 4, and intake valves 14 and exhaust valves 15 for opening and closing the intake ports 12 and the exhaust ports 13 are respectively attached to the intake ports 12 and exhaust ports 13. The intake and exhaust valves 14 and 15 are respectively biased in their close directions (upward direction of FIG. 1) by return springs 16 and 17. Cam followers 20a and 21a rotatably provided in substantially center parts of swing arms 20 and 21, respectively, are pushed downward by cam parts 18a and 19a provided to outer circumferences of rotatable camshafts 18 and 19. Each of the swing arms 20 and 21 swings by having a top portion of a pivot mechanism 25a provided to one end side of each of the swing arms 20 and 21 as a supporting point. Thus, the intake and exhaust valves 14 and 15 are pushed downward and opened by the other end side parts of the swing arms 20 and 21 against biasing forces of the return springs 16 and 17.

A well-known hydraulic lash adjuster 24 (hereinafter, abbreviated to the HLA 24) for automatically adjusting a valve clearance to zero by using an oil pressure is provided as a pivot mechanism (having a similar configuration to the pivot mechanism 25a of a later-described HLA 25) of each of the swing arms 20 and 21 of the second and third cylinders located in the central area of the engine 2 in the cylinder-row direction. Note that the HLA 24 is only illustrated in FIG. 4.

Moreover, the HLA 25 with a valve stopping mechanism (hereinafter, may simply be referred to as the HLA 25) having the pivot mechanism 25a (see FIGS. 2A, 2B and 2C for details) is provided for each of the swing arms 20 and 21 of the first and fourth cylinders located in both end areas of the engine 2 in the cylinder-row direction. The HLA 25 can automatically adjust the valve clearance to zero similarly to the HLA 24. Additionally, the HLA 25 stops the operations (open/close operations) of the intake and exhaust valves 14 and 15 of the first and fourth cylinders in a reduced-cylinder operation in which operations of the first and fourth cylinders (corresponding to specific cylinders) of all the cylinders of the engine 2 are suspended, whereas, the HLA 25 activates the intake and exhaust valves 14 and 15 of the first and fourth cylinders (causes them to perform the open/close operations) in an all-cylinder operation in which all the cylinders (four cylinders) are operated. The intake and exhaust valves 14 and 15 of the second and third cylinders are operated in both the reduced-cylinder operation and the all-cylinder operation. Therefore, in the reduced-cylinder operation, the operations of the intake and exhaust valves 14 and 15 of only the first and fourth cylinders among all the cylinders of the engine 2 are stopped, and in the all-cylinder operation, the intake and exhaust valves 14 and 15 of all the cylinders are operated. Note that the reduced-cylinder operation and the all-cylinder operation are switched according to an operating state of the engine 2 as described later.

Attaching holes 26 and 27 are formed in intake and exhaust portions of the cylinder head 4 corresponding to the first and fourth cylinders. A lower end portion of the HLA 25 is attached to each of the attaching holes 26 and 27 by being inserted thereinto. Moreover, attaching holes similar to the attaching holes 26 and 27 are formed in intake and exhaust portions of the cylinder head 4 corresponding to the second and third cylinders. A lower end portion of the HLA 24 is attached to each of the attaching holes by being inserted thereinto. Further, oil paths 61 to 64 are bored in the cylinder head 4. The two oil paths 61 and 63 communicate with the attaching hole 26 for the HLA 25, and the two oil paths 62 and 64 communicate with the attaching hole 27 for the HLA 25. In the state where the HLAs 25 are fitted into the attaching holes 26 and 27, the oil paths 61 and 62 supply the oil pressure (operating pressure) for operating a later-described valve stopping mechanism 25*b* (see FIGS. 2A, 2B and 2C) of the HLA 25, and the oil paths 63 and 64 supply the oil pressure for the pivot mechanism 25*a* of the HLA 25 to automatically adjust the valve clearance to zero. Note that the attaching holes for the HLA 24 only communicate with the oil paths 63 and 64. The oil paths 61 to 64 are described later with reference to FIG. 4.

The cylinder block 5 is formed with a main gallery 54 extending within an exhaust-side wall of the cylinder bore 7 in the cylinder-row direction. A piston-cooling oil jet 28 (oil injection valve) communicating with the main gallery 54 is provided near a lower end of the main gallery 54 for each piston 8. The oil jet 28 has a nozzle portion 28*a* disposed below the piston 8 so that the nozzle portion 28*a* injects engine oil (hereinafter, simply referred to as oil) toward a back face of a top part of the piston 8.

Oil showers 29 and 30 formed by pipes are respectively provided above the camshafts 18 and 19 so that lubricating oil drops, from the oil shower 29 and 30, on the cam parts 18*a* and 19*a* of the camshafts 18 and 19 located below the oil showers 29 and 30, and also on, further therebelow, contacting portions between the swing arm 20 and the cam follower 20*a* and between the swing arm 21 and the cam follower 21*a*, respectively.

Next, the valve stopping mechanism 25*b* (corresponding to the locking mechanism) of a hydraulically-actuated valve stopping device serving as one of hydraulically-actuated devices is described with reference to FIGS. 2A, 2B, and 2C. The valve stopping mechanism 25*b* stops, by using the oil pressure, the operation of at least one of the intake and exhaust valves 14 and 15 (in this embodiment, both valves) of each of the first and fourth cylinders which are the part of all the cylinders of the engine 2, according to the operating state of the engine 2. Thus, when the operation mode of the engine is switched to the reduced-cylinder operation according to the operating state of the engine 2, the open/close operations of the intake and exhaust valves 14 and 15 of the first and fourth cylinders are stopped by the valve stopping mechanism 25*b*, and when the operation mode of the engine is switched to the all-cylinder operation, the valve stopping operation by the valve stopping mechanism 25*b* is not performed and the open/close operations of the intake and exhaust valves 14 and 15 of the first and fourth cylinders are performed.

In this embodiment, the valve stopping mechanism 25*b* is provided to the HLA 25. Thus, the HLA 25 includes the pivot mechanism 25*a* and the valve stopping mechanism 25*b*. The pivot mechanism 25*a* has substantially the same configuration as the pivot mechanism of the well-known HLA 24, in which the valve clearance is automatically adjusted to zero by using the oil pressure.

The valve stopping mechanism 25*b* includes a bottomed outer cylinder 251 containing the pivot mechanism 25*a* to be slideable in an axial direction of the pivot mechanism 25*a*. The valve stopping mechanism 25*b* includes a pair of lock pins 252 provided to be able to enter into and exit from two penetrating holes 251*a* formed in a side circumferential face of the outer cylinder 251 to face each other, and for switching a state of the pivot mechanism 25*a* between a locked state and an unlocked state, the pivot mechanism 25*a* being located above the lock pins 252 and slideable in the axial direction. The valve stopping mechanism 25*b* includes a lock spring 253 for biasing the pair of lock pins 252 outward in a radial direction. The valve stopping mechanism 25*b* includes a lost motion spring 254 provided between an inner bottom part of the outer cylinder 251 and a bottom part of the pivot mechanism 25*a*, and for biasing the pivot mechanism 25*a* in an upper direction of the outer cylinder 251 by pushing.

Figures 2A, 2B, 2C:
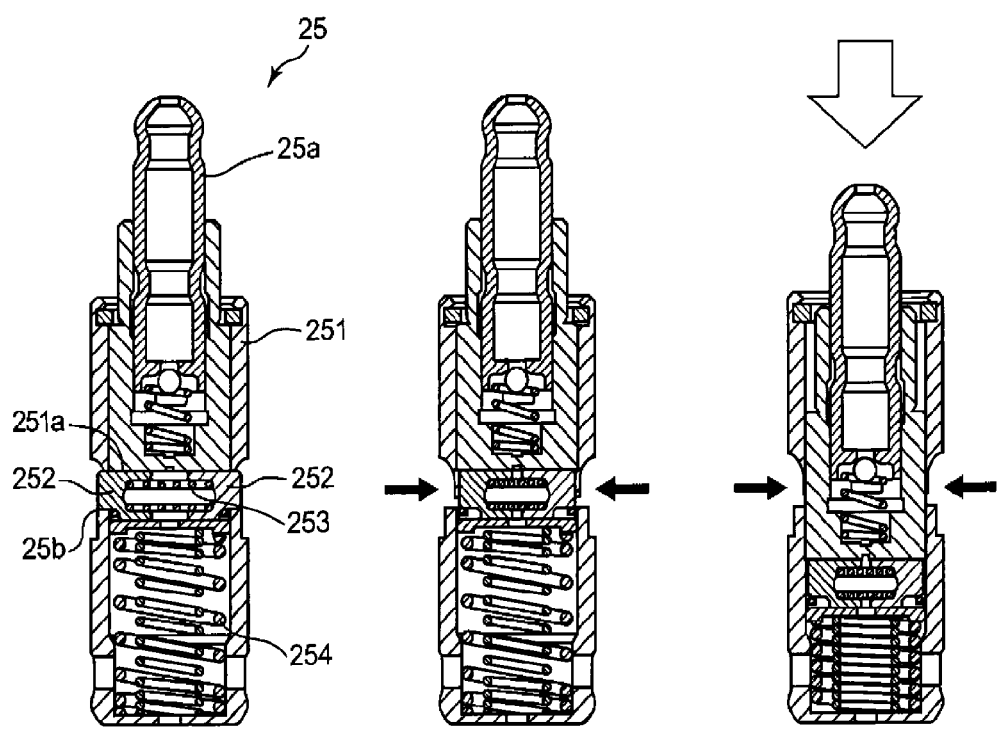
FIGS. 2A to 2C are cross-sectional views illustrating a configuration and operation of a hydraulically-actuated valve stopping device.

As illustrated in FIG. 2A, when the lock pins 252 fit into the penetrating holes 251*a* of the outer cylinder 251 and the pivot mechanism 25*a* is in the locked state where it is fixed protruding upward, the top portion of the pivot mechanism 25*a* in the locked state serves as the supporting point for each of the swing arms 20 and 21 to swing, and therefore, when the cam parts 18*a* and 19*a* respectively push the cam followers 20*a* and 21*a* downward by the rotations of the camshafts 18 and 19, the intake and exhaust valves 14 and 15 are opened by being pushed downward, against the biasing forces of the return springs 16 and 17. Therefore, by bringing the valve stopping mechanisms 25*b* into the locked state for the first and fourth cylinders, the all-cylinder operation can be performed.

On the other hand, as illustrated in FIG. 2B, when outer end surfaces of both of the lock pins 252 are pushed by the operating oil pressure, both of the lock pins 252 move inward in the radial direction of the outer cylinder 251 to come close to each other against a compression force of the lock spring 253, and the lock pins 252 do not fit into the penetrating holes 251*a* of the outer cylinder 251. Thus, the valve stopping mechanism 25*b* enters the unlocked state where the pivot mechanism 25*a* located above the lock pins 252 is movable in the axial direction.

When the pivot mechanism 25*a* is pushed downward against the biasing force of the lost motion spring 254 in the unlocked state, the valve stopping mechanism 25*b* enters a valve stopped state as in FIG. 2C. Specifically, since the return springs 16 and 17 for biasing the intake and exhaust valves 14 and 15 upward have stronger biasing forces than the lost motion spring 254 for biasing the pivot mechanism 25*a* upward, when the cam parts 18*a* and 19*a* push the cam followers 20*a* and 21*a* downward by the rotations of the camshafts 18 and 19 in the unlocked state, top portions of the intake and exhaust valves 14 and 15 serve as the supporting points for the swing arms 20 and 21 to swing, and the pivot mechanisms 25*a* are pushed downward against the biasing forces of the lost motion springs 254 while the intake and exhaust valves 14 and 15 are closed. Therefore, by bringing the valve stopping mechanisms 25*b* into the unlocked state, the reduced-cylinder operation can be performed.

Figure 3A:
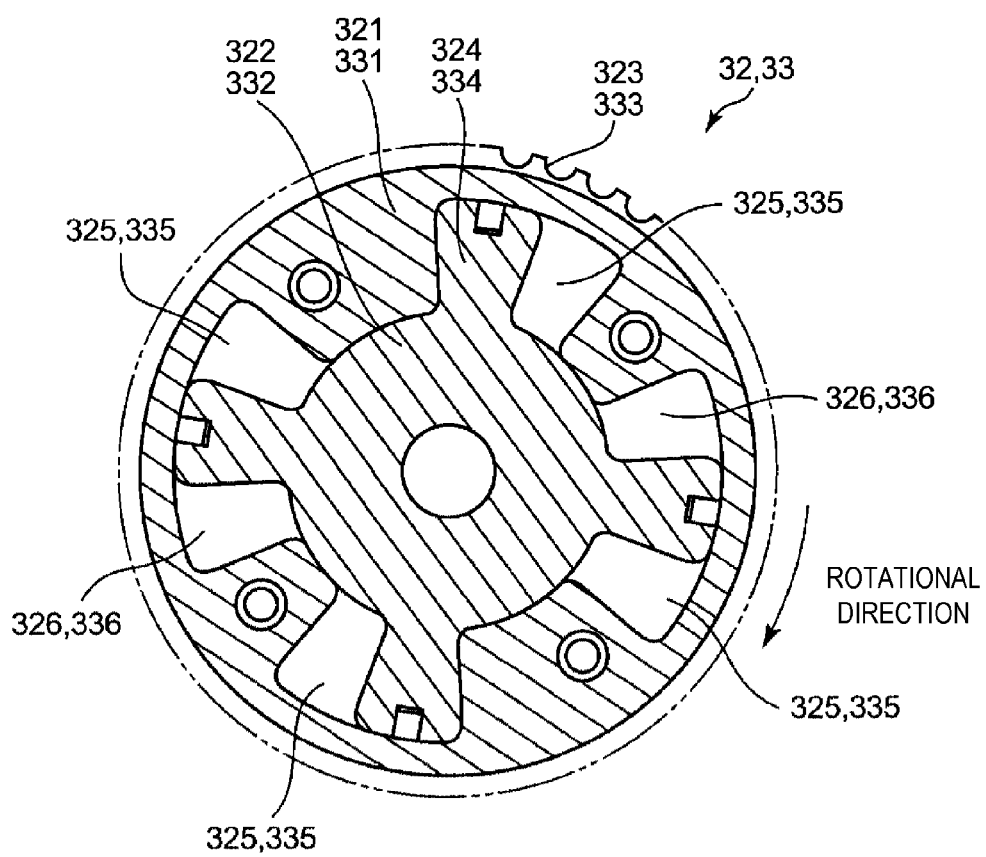
FIG. 3A is a cross-sectional view illustrating a schematic configuration of a variable valve timing mechanism and FIG. 3B is a chart illustrating valve properties of intake and exhaust valves (relation between a phase and a lift).

Next, variable valve timing mechanisms 32 and 33 (hereinafter, simply referred to as the VVT) for changing the valve property of at least one of the intake and exhaust valves 14 and 15 (in this embodiment, both valves) of all the cylinders of the engine 2 by the hydraulic actuation are described with reference to FIG. 3. The VVT 32 is a VVT on the intake side, and the VVT 33 is a VVT on the exhaust side. The VVTs 32 and 33 are hydraulically-actuated devices similarly to the hydraulically-actuated valve stopping device.

The VVTs 32 and 33 respectively have substantially-annular housings 321 and 331, and rotors 322 and 332 accommodated inside the housings 321 and 331. The housings 321 and 331 are respectively coupled integrally and rotatably to cam pulleys 323 and 333 for rotating in synchronization to the crankshaft 9. The rotors 322 and 332 are integrally and rotatably coupled to the camshafts 18 and 19 for opening and closing the intake and exhaust valves 14 and 15, respectively. A plurality of retard-side oil pressure chambers 325 and 335 and a plurality of advance-side oil pressure chambers 326 and 336 partitioned by inner circumferential surfaces of the housings 321 and 331 and vanes 324 and 334 provided onto the rotors 322 and 332 are formed inside the housings 321 and 331. The retard-side oil pressure chambers 325 and 335 and the advance-side oil pressure chambers 326 and 336 are connected to a later-described variable displacement oil pump 36 (see FIG. 4) for supplying the oil, via first direction switch valves 34 and 35 (see FIG. 4). When the oil is introduced into the retard-side oil pressure chambers 325 and 335 by controls performed by the first direction switch valves 34 and 35, the camshafts 18 and 19 are moved by the oil pressure in a direction opposite to their rotational directions (the arrow direction in FIG. 3A), and therefore, open timings of the intake and exhaust valves 14 and 15 are retarded. On the other hand, when the oil is introduced into the advance-side oil pressure chambers 326 and 336, the camshafts 18 and 19 are moved by the oil pressure in their rotational directions, and therefore, the open timings of the intake and exhaust valves 14 and 15 are advanced.

Figure 3B:
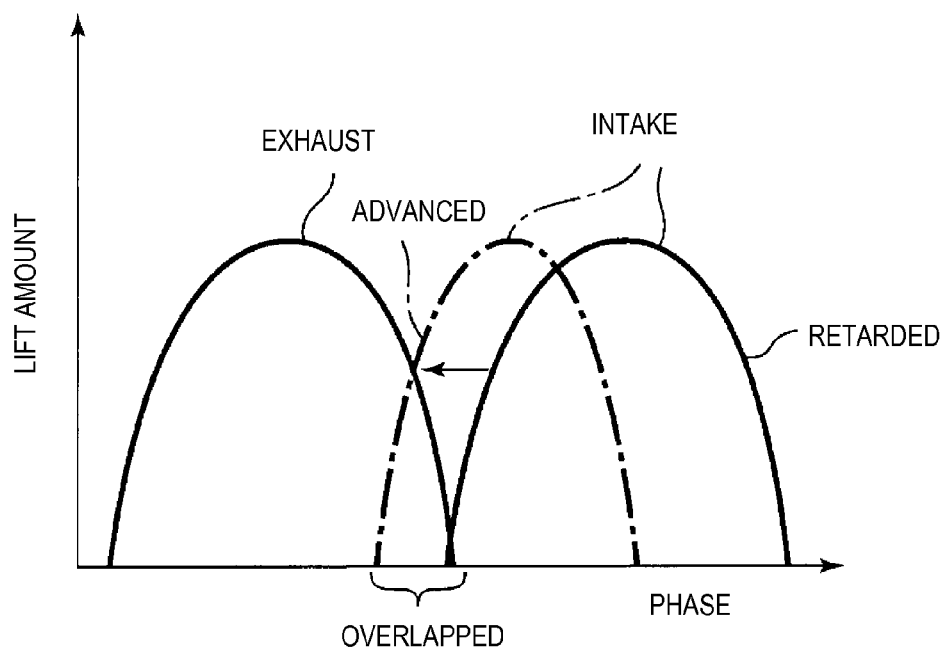

FIG. 3B illustrates opened phases of the intake and exhaust valves 14 and 15. As it can be understood from FIG. 3B, when the opened phase of the intake valve 14 is changed to advance (see the arrow in FIG. 3B) (and/or the opened phase of the exhaust valve 15 is changed to retard) by the VVT 32 (and/or the VVT 33), the open period of the exhaust valve 15 overlaps with the open period of the intake valve 14 (see the dashed line in FIG. 3B). By overlapping the open periods of the intake and exhaust valves 14 and 15 as above, an internal EGR amount during engine combustion can be increased, and a pumping loss is reduced and fuel consumption performance can be improved. Moreover, a combustion temperature can be suppressed, and thus, generation of NOx is suppressed and exhaust gas purification can be achieved. On the other hand, when the opened phase of the intake valve 14 is changed to retard (and/or the opened phase of the exhaust valve 15 is changed to advance) by the VVT 32 (and/or the VVT 33), the valve overlapping amount between the open period of the intake valve 14 (see the solid line) and the open period of the exhaust valve 15 is reduced. Therefore, in a low engine load state where an engine load is lower than a predetermined value (e.g., in idling), stable combustibility can be secured. In this embodiment, to increase the valve overlapping amount as much as possible in a high engine load state, also in the low engine load state, the open periods of the intake and exhaust valves 14 and 15 are overlapped.

Figure 4:
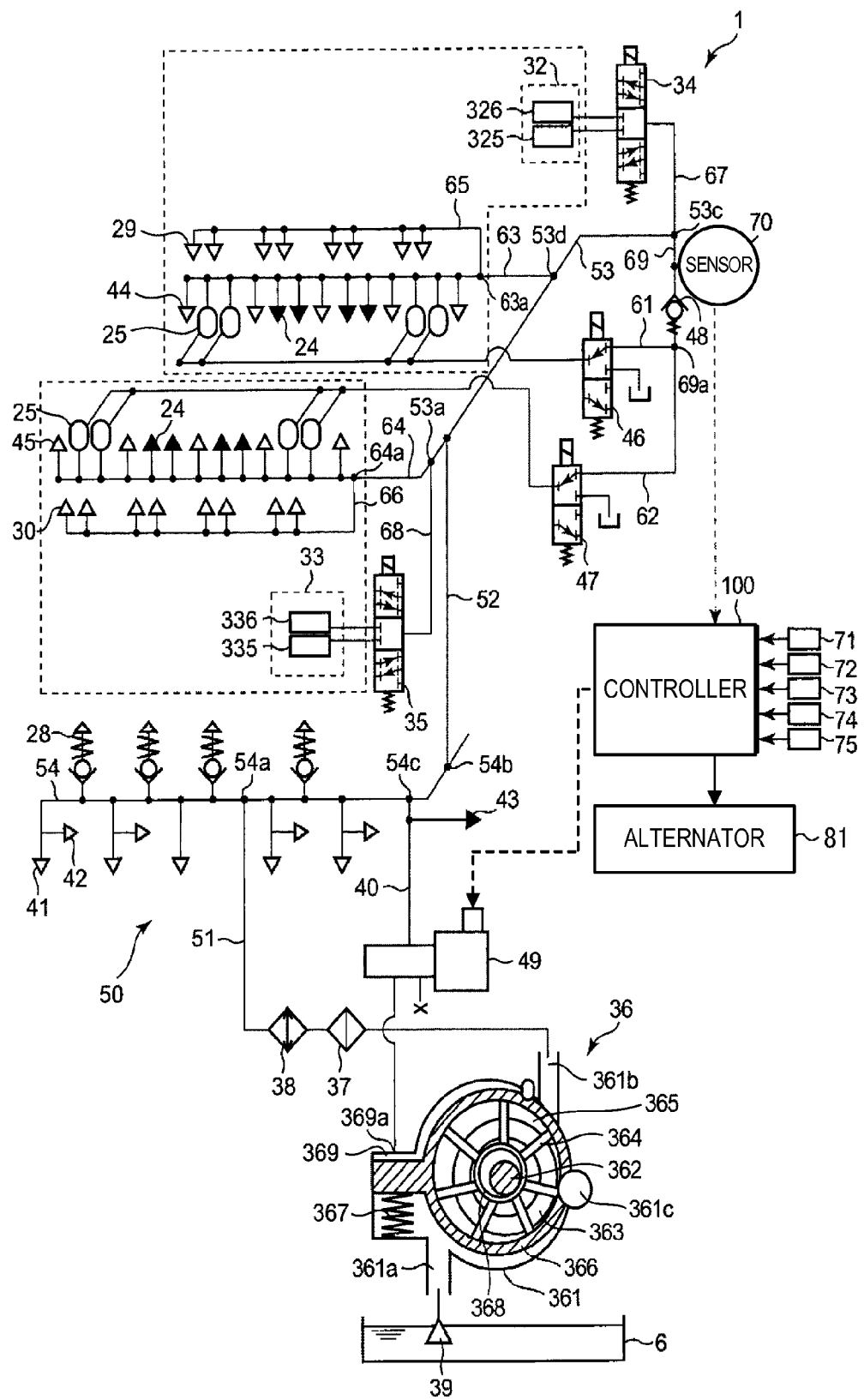
FIG. 4 is a view illustrating a schematic configuration of an oil supply device.

Next, an oil supply device 1 for supplying oil to the engine 2 described above is described in detail with reference to FIG. 4. As illustrated in FIG. 4, the oil supply device 1 includes a variable displacement oil pump 36 (hereinafter, referred to as the oil pump 36) driven by the rotation of the crankshaft 9, and an oil supply path 50 (oil pressure path) connected to the oil pump 36 and for introducing the oil, which is pumped by the oil pump 36, to parts of the engine 2 to be lubricated and the hydraulically-actuated devices. The oil pump 36 is an auxiliary component driven by the engine 2. Specific examples of the auxiliary components also include an alternator 81 (see FIG. 4) serving as a generator driven by the engine 2 to generate power.

The oil supply path 50 is formed of pipes and the passages bored in the cylinder head 4, the cylinder block 5, and the like. The oil supply path 50 communicates with the oil pump 36 and includes a first communicating path 51 extending from the oil pump 36 (specifically, a discharge port 361b described later) to a branching position 54a inside the cylinder block 5. The oil supply path 50 also includes the main gallery 54 extending inside the cylinder block 5 in the cylinder-row direction. The oil supply path 50 also includes a second communicating path 52 extending from a branching position 54b on the main gallery 54 to the cylinder head 4. The oil supply path 50 also includes a third communicating path 53 extending between the intake and exhaust sides in the cylinder head 4 in a substantially horizontal direction. The oil supply path 50 also includes a plurality of oil paths 61 to 69 branching from the third communicating path 53 within the cylinder head 4.

The oil pump 36 is a known variable displacement oil pump for varying its oil discharge amount by changing its capacity. The oil pump 36 includes a housing 361 formed of a pump body and a cover member. The pump body has a pump accommodating chamber that is made of a space formed to open on one end side and having a circular cross-section therein. The cover member blocks the end opening of the pump body. The oil pump 36 also includes a driveshaft 362 rotatably supported by the housing 361, penetrating through a substantially central area of the pump accommodating chamber, and rotatably driven by the crankshaft 9. The oil pump 36 also includes a pump element. The pump element has a rotor 363 rotatably accommodated within the pump accommodating chamber and coupled to the driveshaft 362 in its central portion, and vanes 364 each accommodated to be projectable in one of a plurality of slits radially formed by cutting them out from an outer circumferential part of the rotor 363. The oil pump 36 also includes a cam ring 366 disposed on the outer circumferential side of the pump element to be able to be eccentric with respect to the rotational center of the rotor 363 and forming a pump chamber 365 forming a plurality of operating oil chambers with the rotor 363 and the adjacent vanes 364. The oil pump 36 also includes a spring 367 that is a biasing member accommodated inside the pump body and for always biasing the cam ring 366 to a direction that an eccentric amount of the cam ring 366 with respect to the rotational center of the rotor 363 increases. The oil pump 36 also includes a pair of ring members 368 disposed to be slideable on both inner circumferential side portions of the rotor 363 and having smaller diameters than the rotor 363. The housing 361 includes a suction port 361a from which the oil is supplied to the pump chamber 365 therein, and a discharge port 361b from which the oil is discharged from the pump chamber 365. Inside the housing 361, a pressure chamber 369 is formed by an inner circumferential surface of the housing 361 and an outer circumferential surface of the cam ring 366, and an introduction hole 369a opening to the pressure chamber 369 is formed. The oil pump 36 introduces the oil into the pressure chamber 369 from the introduction hole 369a so that the cam ring 366 swings centering on a supporting point 361c, the rotor 363 becomes relatively eccentric with respect to the cam ring 366, and the discharge capacity of the oil pump 36 is changed.

The suction port 361a of the oil pump 36 is connected to an oil strainer 39 opposing the oil pan 6. On the first communicating path 51 communicating to the discharge port 361b of the oil pump 36, an oil filter 37 and an oil cooler 38 are disposed in the order from the upstream side to the downstream side, and the oil accumulated within the oil pan 6 is sucked by the oil pump 36 through the oil strainer 39, filtered by the oil filter 37, cooled by the oil cooler 38, and then introduced into the main gallery 54 inside the cylinder block 5.

The main gallery 54 is connected to the oil jets 28 for injecting the cooling oil toward the back surfaces of the four pistons 8, oil supplying parts 41 of metal bearings disposed to five main journals rotatably supporting the crankshaft 9, and oil supplying parts 42 of metal bearings rotatably coupling the four connecting rods to each other and disposed to crankpins of the crankshaft 9. The oil is always supplied to the main gallery 54.

A branching position 54c on the main gallery 54 is connected, on its downstream side, to an oil supplying part 43 for supplying the oil to a hydraulic chain tensioner and an oil path 40 for supplying the oil from the introduction hole 369a to the pressure chamber 369 of the oil pump 36 via a linear solenoid valve 49.

The oil path 68 branching from a branching position 53a of the third communicating path 53 is connected, via the exhaust-side first direction switch valve 35, to the advance-side oil pressure chamber 336 and the retard-side oil pressure chamber 335 of the exhaust VVT 33 for changing the open and close timings of the exhaust valve 15, and supplies the oil by controlling the first direction switch valve 35. Moreover, the oil path 64 branching from the branching position 53a is connected to oil supplying parts 45 (see the white triangles in FIG. 4) of metal bearings disposed to cam journals of the camshaft 19 on the exhaust side, the HLAs 24 (see the black triangles in FIG. 4), and the HLAs 25 (see the white ellipses in FIG. 4). The oil is always supplied to the oil path 64. Further, the oil path 66 branching from a branching position 64a of the oil path 64 is connected to the oil showers 30 for supplying the lubricating oil to the swing arms 21 on the exhaust side, and the oil is always supplied to the oil path 66.

Also on the intake side, similarly to the exhaust side, the oil path 67 branching from a branching position 53c of the third communicating path 53 is connected, via the intake-side first direction switch valve 34, to the advance-side oil pressure chamber 326 and the retard-side oil pressure chamber 325 of the VVT 32 for changing the open and close timings of the intake valve 14. Moreover, the oil path 63 branching from a branching position 53d is connected to oil supplying parts 44 (see the white triangles in FIG. 4) of metal bearings disposed to cam journals of the camshaft 18 on the intake side, the HLAs 24 (see the black triangles in FIG. 4), and the HLAs 25 (see the white ellipses in FIG. 4). Further, the oil path 65 branching from a branching position 63a of the oil path 63 is connected to the oil showers 29 for supplying the lubricating oil to the swing arms 20 on the intake side.

Moreover, the oil path 69 branching from the branching position 53c of the third communicating path 53 is provided therein with a one-way valve 48 for regulating the oil flow to only one direction of upstream to downstream, and an oil pressure sensor 70 located between the one-way valve 48 and the branching position 53c and for detecting the oil pressure within the oil supply path 50 (the upstream side of the one-way valve 48 within the oil path 69). The oil pressure sensor 70 configures an oil pressure detecting device for detecting the oil pressure within the hydraulic path (oil supply path 50) for supplying, by the oil pump 36, the oil to the parts of the engine 2 to be lubricated and the hydraulically-actuated devices.

The oil path 69 branches into the two oil paths 61 and 62 communicating with the attaching holes 26 and 27 for the HLA 25 at a branching position 69a located downstream of the one-way valve 48. The oil paths 61 and 62 are connected to the valve stopping mechanisms 25b of the HLAs 25 on the intake and exhaust sides via intake and exhaust second direction switch valves 46 and 47, and the oil paths 61 and 62 supply the oil to the respective valve stopping mechanisms 25b by controlling the second direction switch valves 46 and 47, respectively.

After the lubricating oil and the cooling oil supplied to the metal bearings, which rotatably support the crankshaft 9 and the camshafts 18 and 19, the pistons 8, the camshafts 18 and 19, and the like finish cooling and lubricating, they pass through a drain oil path (not illustrated) to drop into the oil pan 6, and then are re-circulated by the oil pump 36.

The operation of the engine 2 is controlled by a controller 100. The controller 100 receives detection information from various sensors for detecting the operating state of the engine 2. For example, the controller 100 controls a crank angle sensor 71 to detect a rotational angle of the crankshaft 9, and detects an engine speed based on the detection signal. Moreover, the controller 100 controls a throttle position sensor 72 to detect a stepped amount (accelerator opening) of an acceleration pedal of the vehicle, in which the engine 2 is installed, by a driver, and detects the engine load based on the stepped amount. Further, the controller 100 controls an oil temperature sensor 73 and the oil pressure sensor 70 to detect a temperature and the pressure of the oil within the hydraulic path. The oil temperature sensor 73 is disposed within the hydraulic path (in this embodiment, the third communicating path 53 of the oil supply path 50). Further, the controller 100 controls cam angle sensors 74 respectively provided near the camshafts 18 and 19, to detect rotational phases of the camshafts 18 and 19, and detects operational angles of the VVTs 32 and 33 based on the cam angles. Moreover, the controller 100 controls a fluid temperature sensor 75 to detect a temperature of a coolant (hereinafter, referred to as the coolant temperature) for cooling the engine 2.

The controller 100 is a control device based on a well-known microcomputer, and includes a signal receiving unit for receiving the detection signals from the various sensors (e.g., the oil pressure sensor 70, the crank angle sensor 71, the throttle position sensor 72, the oil temperature sensor 73, the cam angle sensors 74, and the fluid temperature sensor 75), an operator for performing operation processing relating to the various controls, a signal output unit for outputting control signals to the devices to be controlled (e.g., the first direction switch valves 34 and 35, the second direction switch valves 46 and 47, the linear solenoid valve 49, and the alternator 81), and a storage for storing programs and data required in the controls (e.g., later-described oil pressure control maps and duty ratio maps).

The linear solenoid valve 49 is a flow rate (discharge amount) control valve for controlling the discharge amount from the oil pump 36 according to the operating state of the engine 2. In this embodiment, the oil is supplied to the pressure chamber 369 of the oil pump 36 when the linear solenoid valve 49 is opened. The description of the configuration of the linear solenoid valve 49 itself is omitted since it is well known. Note that the flow rate (discharge amount) control valve is not limited to the linear solenoid valve 49 and, for example, an electromagnetic control valve may be used.

Figure 5:
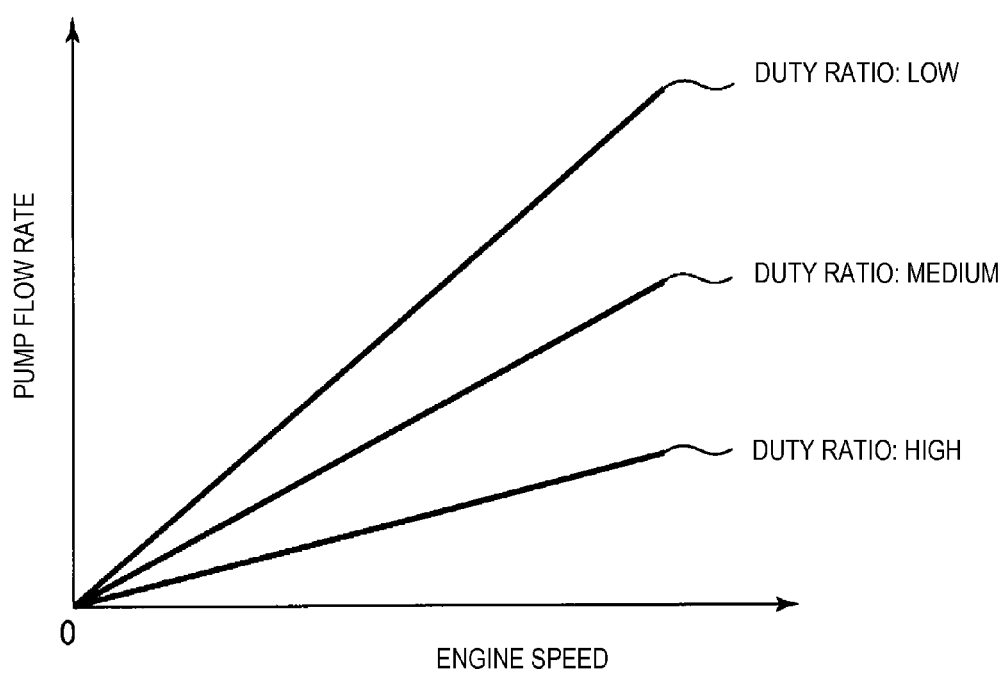
FIG. 5 is a chart illustrating a property of a variable displacement oil pump.

The controller 100 transmits, to the linear solenoid valve 49, the control signal of the duty ratio according to the operating state of the engine 2 to control the oil pressure to be supplied to the pressure chamber 369 of the oil pump 36 via the linear solenoid valve 49. By using the oil pressure inside the pressure chamber 369 to control the eccentric amount of the cam ring 366 and control a change amount of an internal volume of the pump chamber 365, the flow rate (discharge amount) of the oil pump 36 is controlled. In other words, the capacity of the oil pump 36 is controlled by the duty ratio. Here, since the oil pump 36 is driven by the crankshaft 9 of the engine 2, as illustrated in FIG. 5, the flow rate (discharge amount) of the oil pump 36 is in proportion to the engine speed. Further, in a case where the duty ratio indicates a rate of a power distribution period of time of the linear solenoid valve 49 with respect to a period of time for one cycle, as illustrated in FIG. 5, as the duty ratio becomes higher, the oil pressure to the pressure chamber 369 of the oil pump 36 becomes larger and, thus, the change of the flow rate with respect to the engine speed becomes less. Therefore, the drive load of the oil pump 36 driven by the engine 2 is increased as the discharge amount of the oil pump 36 increases, in other words, controlling the discharge amount of the oil pump 36 leads to controlling the drive load of the oil pump 36.

As described above, the controller 100 configures a pump control device for controlling the discharge amount of the oil pump 36 by changing the capacity of the oil pump 36, and also configures an auxiliary component control device for controlling the drive load of the oil pump 36 which is the auxiliary component. Moreover, the controller 100 also controls a drive load of the alternator 81 which also is the auxiliary component.

Figure 6A:
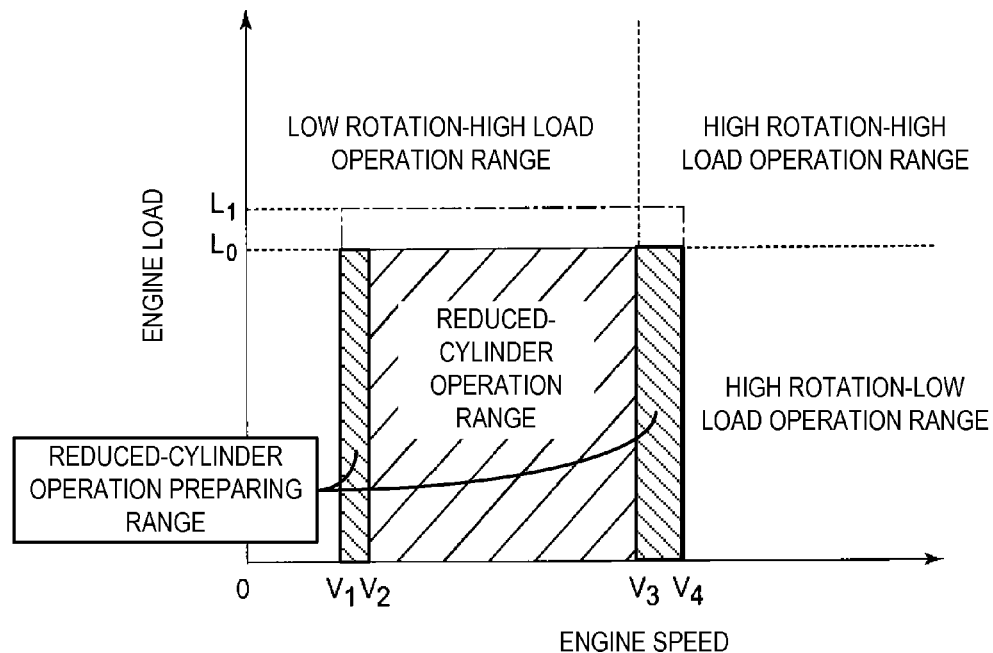
FIGS. 6A and 6B are views illustrating a reduced-cylinder operating range of the engine.
Figure 6B:
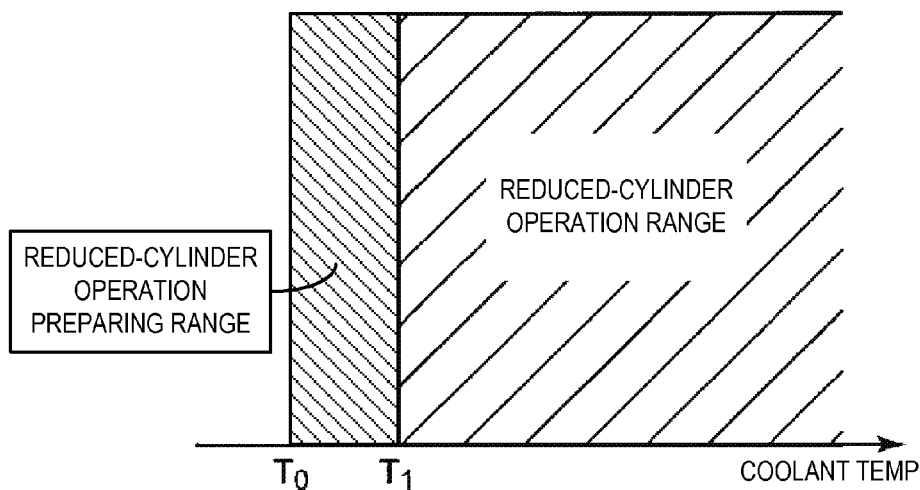

Next, the reduced-cylinder operation of the engine 2 is described with reference to FIGS. 6A and 6B. The reduced-cylinder operation and the all-cylinder operation of the engine 2 are switched therebetween according to the operating state of the engine 2. Specifically, the reduced-cylinder operation is performed when the operating state of the engine 2 obtained based on the engine speed, the engine load, and the coolant temperature of the engine 2 is within a reduced-cylinder operating range in FIGS. 6A and 6B. Moreover, as illustrated in FIGS. 6A and 6B, a reduced-cylinder operation preparing range is provided continuously next to the reduced-cylinder operating range, and when the operating state of the engine is within the reduced-cylinder operation preparing range, as a preparation for performing the reduced-cylinder operation, the oil pressure is increased to a required oil pressure of the valve stopping mechanism 25b in advance. Further, when the operating state of the engine 2 is in neither the reduced-cylinder operating range nor the reduced-cylinder operation preparing range, the all-cylinder operation is performed.

With reference to FIG. 6A, in a case where the engine is accelerated at a predetermined engine load (L0 or lower) and the engine speed is increased, when the engine speed is lower than a predetermined speed V1, the all-cylinder operation is performed, when the engine speed becomes V1 or higher but lower than V2 (>V1), the preparation for the reduced-cylinder operation is performed, and when the engine speed becomes V2 or higher, the reduced-cylinder operation is performed. Moreover, for example, in a case where the engine is decelerated at the predetermined engine load (L0 or lower) and the engine speed is decreased, when the engine speed is V4 or higher, the all-cylinder operation is performed, when the engine speed becomes higher than V3 (<V4) but lower than V4, the preparation for the reduced-cylinder operation is performed, and when the engine speed becomes V3 or lower, the reduced-cylinder operation is performed.

With reference to FIG. 6B, in a case where the vehicle travels at a predetermined engine speed (between V2 and V3) at the predetermined engine load (L0 or lower), the engine 2 is warmed up, and the coolant temperature is increased, the all-cylinder operation is performed when the coolant temperature is lower than T0, the preparation of the reduced-cylinder operation is performed when the coolant temperature becomes T0 or higher but lower than T1, and the reduced-cylinder operation is performed when the coolant temperature becomes T1 or higher.

If the reduced-cylinder operation preparing range is not provided, when switching from the all-cylinder operation to the reduced-cylinder operation, the oil pressure is increased to the required oil pressure of the valve stopping mechanism 25b after the operating state of the engine 2 enters the reduced-cylinder operating range. In this case, a period of time to perform the reduced-cylinder operation becomes shorter by a period of time required for the oil pressure to reach the required oil pressure, and thus, the fuel consumption efficiency degrades.

Therefore, in this embodiment, in order to improve the fuel consumption efficiency of the engine 2 to the maximum, the reduced-cylinder operation preparing range is provided continuously next to the reduced-cylinder operating range, the oil pressure is increased in advance in the reduced-cylinder operation preparing range, and a target oil pressure (see FIG. 7A) is set so as to eliminate the time loss for the oil pressure to reach the required oil pressure.

Note that, as illustrated in FIG. 6A, the range continuously next to the reduced-cylinder operation range on the higher engine load side and defined by the dashed line may be the reduced-cylinder operation preparing range. Thus, for example, in a case where the engine load is reduced at the predetermined engine speed (between V2 and V3), when the engine load is L1 (>L0) or higher, the all-cylinder operation is performed, when the engine load becomes higher than L0 but lower than L1, the preparation for the reduced-cylinder operation is performed, and when the engine load becomes L0 or lower, the reduced-cylinder operation is performed.

Next, required oil pressures of the respective hydraulically-actuated devices (here, in addition to the valve stopping mechanism 25b and the VVTs 32 and 33, the oil jet 28, the metal bearings [such as the journals of the crankshaft 9] are also included in the hydraulically-actuated devices) and the target oil pressure of the oil pump 36 are described with reference to FIGS. 7A and 7B. The oil supply device 1 of this embodiment supplies the oil to the plurality of hydraulically-actuated devices by the single oil pump 36, and the required oil pressures of the respective hydraulically-actuated devices change according to the operating state of the engine 2. Therefore, to obtain the oil pressure required by all the hydraulically-actuated devices in all the operating states of the engine 2, the oil pump 36 needs to set an oil pressure higher than the highest required oil pressure among the required oil pressures of the respective hydraulically-actuated devices in each operating state of the engine 2, to be the target oil pressure according to the operating state of the engine 2. Therefore, in this embodiment, the target oil pressure is set to satisfy the required oil pressures of the valve stopping mechanism 25b, the oil jet 28, the metal bearings (such as the journals of the crankshaft 9), and the VVTs 32 and 33 of which the required oil pressures are comparatively high among all the hydraulically-actuated devices, because by setting the target oil pressure as above, the required oil pressures of the other hydraulically-actuated devices of which the required oil pressure is comparatively low are naturally satisfied.

Figure 7A:
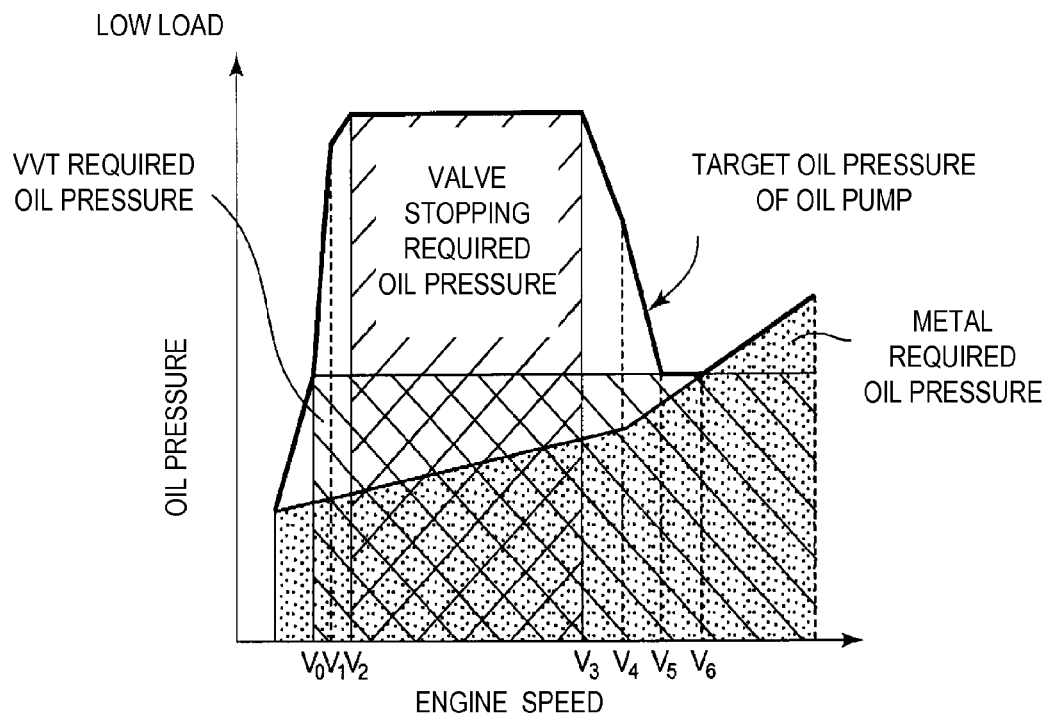
FIGS. 7A and 7B are charts for describing setting of a target oil pressure of the pump.

With reference to FIG. 7A, when the engine 2 is operated in the low engine load state, the hydraulically-actuated devices of which the required oil pressure is comparatively high are the VVTs 32 and 33, the metal bearings and the valve stopping mechanism 25*b*. The required oil pressures of these respective hydraulically-actuated devices change according to the operating state of the engine 2. For example, each of the required oil pressures of the VVTs 32 and 33 (described as the "VVT required oil pressure" in FIGS. 7A and 7B) is substantially fixed when the engine speed is V0 (<V1) or higher. The required oil pressure of the metal bearings (described as the "metal required oil pressure" in FIGS. 7A and 7B) increases as the engine speed is increased. The required oil pressure of the valve stopping mechanism 25*b* (described as the "valve stopping required oil pressure" in FIGS. 7A and 7B) is substantially fixed when the engine speed is within a predetermined range (between V2 and V3). Further, in a case where these required oil pressures are compared with respect to the engine speed, when the engine speed is lower than V0, only the metal required oil pressure is required, when the engine speed is between V0 and V2, the VVT required oil pressure is the highest, when the engine speed is between V2 and V3, the valve stopping required oil pressure is the highest, when the engine speed is between V3 and V6, the VVT required oil pressure is the highest, and when the engine speed is higher than V6, the metal required oil pressure is the highest. Therefore, the target oil pressure of the oil pump 36 needs to be set by having the highest required oil pressure at each engine speed range as a reference target oil pressure.

Here, in the engine speed ranges (between V1 and V2 and between V3 and V4) around the engine speed range in which the reduced-cylinder operation is performed (between V2 and V3), the reference target oil pressure is corrected so that the target oil pressure increases toward the valve stopping required oil pressure in advance for the preparation of the reduced-cylinder operation. According to this, as described in FIGS. 6A and 6B, the time loss for the oil pressure to reach the valve stopping required oil pressure when the engine speed is changed to the speed at which the reduced-cylinder operation is performed is eliminated, and the fuel consumption efficiency of the engine can be improved. One example of the target oil pressure of the oil pump 36 set by this correction (described as the "oil pump target oil pressure" in FIGS. 7A and 7B) is indicated by the thick line in FIG. 7A (between V1 and V2, and between V3 and V4).

Further, considering a response delay of the oil pump 36, an overload of the oil pump 36 and the like, it is preferred that the corrected reference target oil pressure for the reduced-cylinder operation preparation described above is further corrected to be set as the target oil pressure by either being gradually increased or reduced based on the engine speed within the extent that the oil pressure is higher than the required oil pressure so that the change of the oil pressure at the engine speeds (e.g., V0, V1 and V4) at which the required oil pressure significantly changes with respect to the change of the engine speed becomes smaller. One example of the target oil pressure of the oil pump 36 set by this correction is indicated by the thick line in FIG. 7A (lower than V0, between V0 and V1, and between V4 and V5).

Figure 7B:
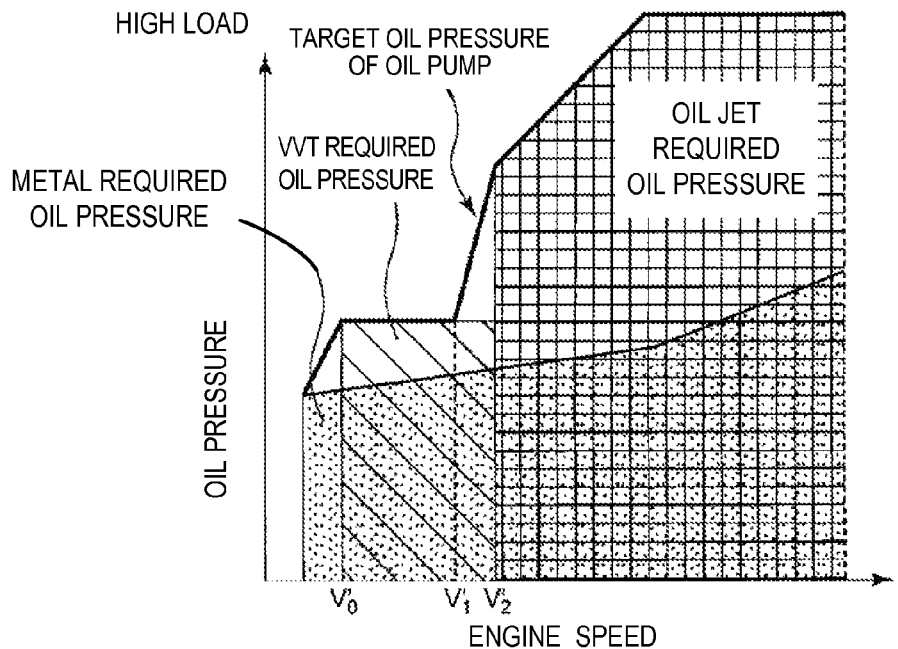

With reference to FIG. 7B, when the engine 2 is operated in the high engine load state, the hydraulically-actuated devices of which the required oil pressure is comparatively high are the VVTs 32 and 33, the metal bearings, and the oil jet 28. Similarly to the case of the operation in the low engine load state, the required oil pressures of these respective hydraulically-actuated devices change according to the operating state of the engine 2, and for example, the VVT required oil pressure is substantially fixed when the engine speed is V0' or higher, the metal required oil pressure is increased as the engine speed is increased. Moreover, the required oil pressure of the oil jet 28 is zero when the engine speed is lower than VT, then it increases according to the increase of the engine speed until it reaches a certain speed, and it is fixed when the engine speed is higher than the certain speed.

In the case of the operation in the high engine load state, also similarly to the case of the operation in the low engine load state, it is preferred that the reference target oil pressure is corrected to be the target oil pressure at the engine speeds (e.g., V0' and VT) at which the required oil pressure significantly changes with respect to the change of the engine speed, and one example of the target oil pressure of the oil pump 36 suitably corrected (particularly corrected at V0' or lower and between V1' and V2') and set is indicated by the thick line in FIG. 7B.

Note that although the illustrated target oil pressure of the oil pump 36 changes in a polygonal line, it may change smoothly in a curve. Moreover, in this embodiment, the target oil pressure is set based on the required oil pressures of the valve stopping mechanism 25*b*, the oil jet 28, the metal bearings, and the VVTs 32 and 33 with the comparatively high required oil pressures; however, the hydraulically-actuated devices that can be considered in setting the target oil pressure are not limited to these. The target oil pressure may be set by taking a required oil pressure of any hydraulically-actuated device into consideration, as long as its required oil pressure is comparatively high.

Next, oil pressure control maps are described with reference to FIGS. 8A, 8B and 8C. While the target oil pressure of the oil pump 36 in FIGS. 7A and 7B is set by using the engine speed as a parameter, in each of the oil pressure control maps in FIGS. 8A, 8B and 8C, the target oil pressure is indicated in a three-dimensional chart by also using the engine load and the oil temperature as parameters. Specifically, in each oil pressure control map, based on the highest required oil pressure among the required oil pressures of the respective hydraulically-actuated devices in each operating state of the engine 2 (here, the oil temperature is also included in addition to the engine speed and the engine load), the target oil pressure according to the operating state is set in advance.

Figure 8A:
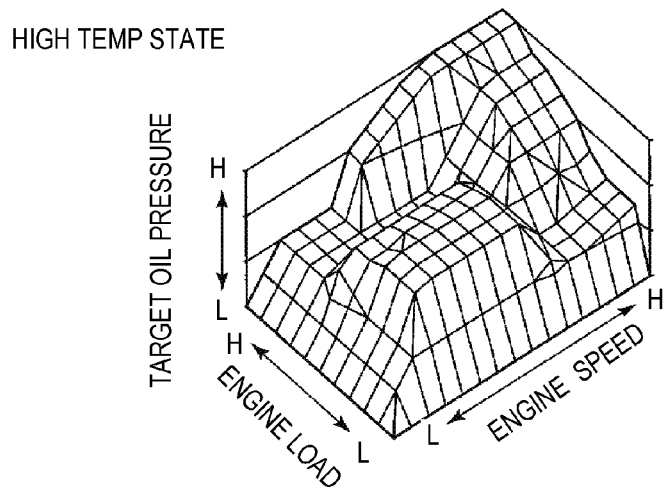
FIGS. 8A to 8C are oil pressure control maps each illustrating a target oil pressure according to an operating state of the engine.
Figure 8B:
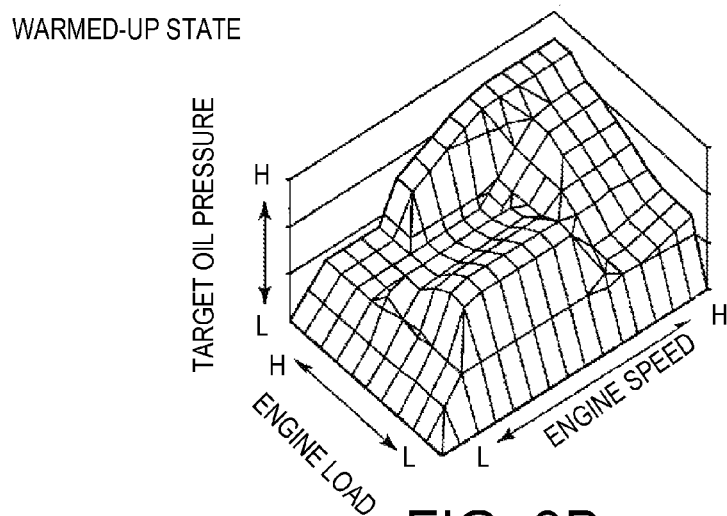
Figure 8C:
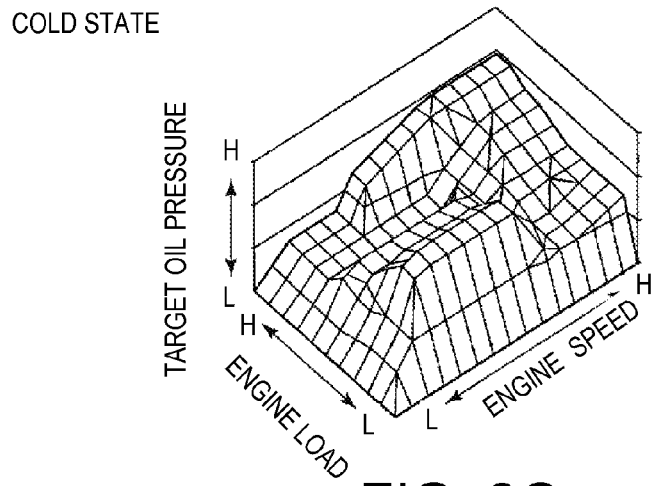

FIGS. 8A, 8B and 8C are the oil pressure control maps when the engine 2 (oil temperature) is in a high temperature state, in a warmed-up state, and in a cold state, respectively. The controller 100 changes the oil control map to use according to the oil temperature. Specifically, when the engine 2 is started and while the engine 2 is in the cold state (the oil temperature is below T1), the controller 100 reads the target oil pressure according to the operating state of the engine 2 (the engine speed and the engine load) based on the oil pressure control map in the cold state illustrated in FIG. 8C. When the engine 2 is warmed up and the oil becomes the predetermined temperature T1 or higher, the controller 100 reads the target oil pressure based on the oil pressure control map in the warmed-up state illustrated in FIG. 8B, and when the engine 2 is completely warmed up and the oil becomes a predetermined oil temperature T2 (>T1) or higher, the controller 100 reads the target oil pressure based on the oil pressure control map in the high temperature state illustrated in FIG. 8A.

Note that, in this embodiment, the target oil pressure is read by using the oil pressure control maps, each set in advance for each of the three oil temperature ranges (states) of the high temperature state, the warmed-up state, and the cold state; however, the target oil pressure may be read by only using one oil pressure control map without considering the oil temperature, or alternatively a larger number of oil pressure control maps may be prepared by dividing the temperature range more finely. Further, in this embodiment, all the oil temperatures t within the temperature range (T1<t<T2) targeted in one oil pressure control map (e.g., the oil pressure control map in the warmed-up state) take the same target oil pressure P1; however, by taking a target oil pressure (P2) within the adjacent temperature range (T2<t) into consideration, it may be such that the target oil pressure p can be calculated based on a proportional conversion (p=(t−T1)×(P2−P1)/(T2−T1) according to the oil temperature t. By enabling highly accurate readings and calculations of the target oil pressure according to the temperature, the pump capacity can be controlled at higher accuracy.

Next, duty ratio maps are described with reference to FIGS. 9A, 9B and 9C. Here, in each duty ratio map, the target oil pressure in each operating state of the engine 2 (the engine speed, the engine load, and the oil temperature) is read from the oil pressure control map described above, a target discharge amount of the oil supplied from the oil pump 36 is set based on the read target oil pressure in consideration of, for example, flow resistances in the oil paths, and a target duty ratio according to the operating state is set in advance by being calculated based on the set target discharge amount in consideration of, for example, the engine speed (oil pump speed).

Figure 9A:
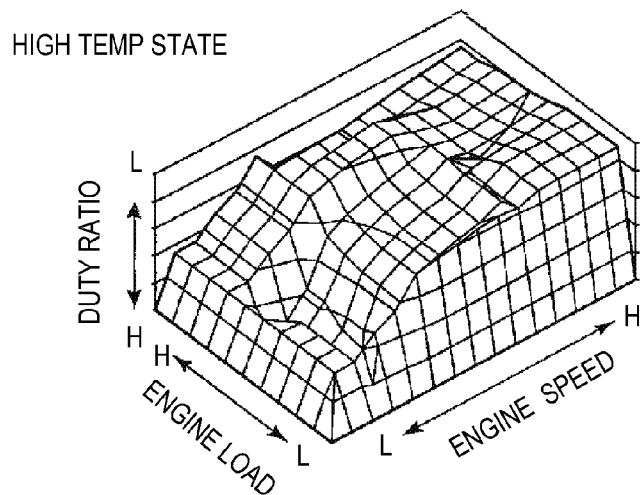
FIGS. 9A to 9C are duty ratio maps each illustrating a duty ratio according to the operating state of the engine.
Figure 9B:
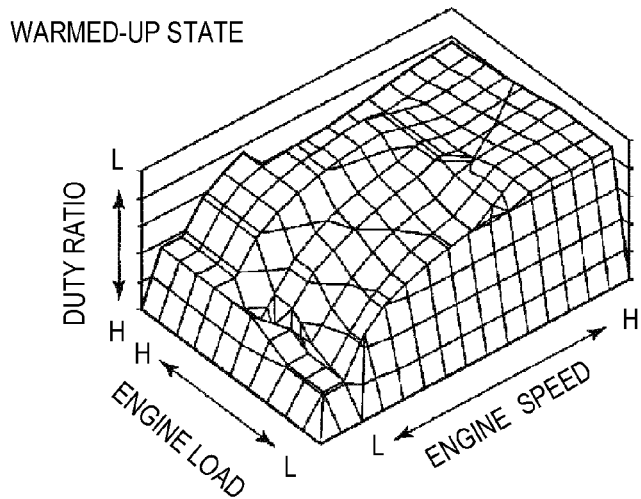
Figure 9C:
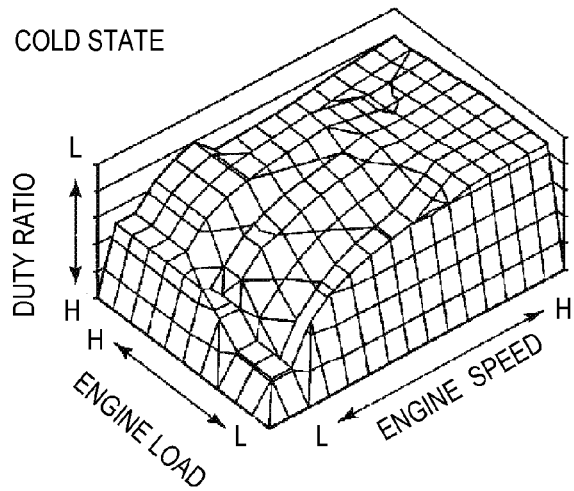

FIGS. 9A, 9B and 9C are the duty ratio maps when the engine 2 (oil temperature) is in the high temperature state, in the warmed-up state, and in the cold state, respectively. The controller 100 changes the duty ratio map to use according to the oil temperature. Specifically, when the engine 2 is started, since the engine 2 is in the cold state, the controller 100 reads the duty ratio according to the operating state of the engine 2 (the engine speed and the engine load) based on the duty ratio map in the cold state illustrated in FIG. 9C. When the engine 2 is warmed up and the oil becomes the predetermined temperature T1 or higher, the controller 100 reads the target duty ratio based on the duty ratio map in the warmed-up state illustrated in FIG. 9B, and when the engine 2 is completely warmed up and the oil becomes the predetermined oil temperature T2 (>T1) or higher, the controller 100 reads the target duty ratio based on the duty ratio map in the high temperature state illustrated in FIG. 9A.

Note that, in this embodiment, the target duty ratio is read by using the duty ratio maps, each set in advance for each of the three oil temperature ranges (states) of the high temperature state, the warmed-up state, and the cold state; however, similarly to the oil pressure control maps described above, it may be such that only one duty ratio map is prepared or a larger number of duty ratio maps are prepared by dividing the temperature range more finely, or the target duty ratio may be calculated by the proportional conversion according to the oil temperature.

Figure 10:
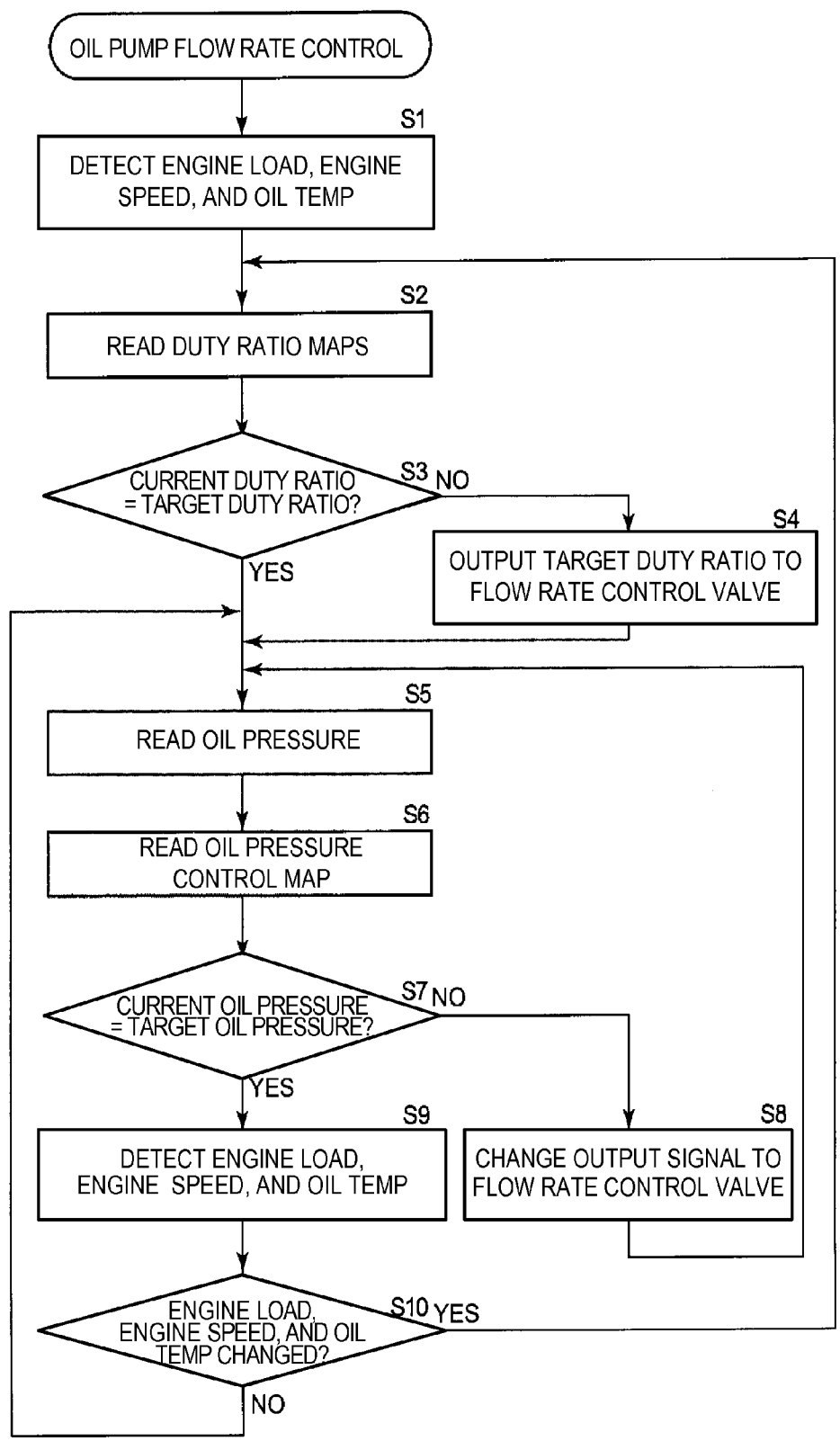
FIG. 10 is a flowchart illustrating an operation of a flow rate (discharge amount) control of the oil pump by a controller.

Next, a control of the flow rate (discharge amount) of the oil pump 36 performed by the controller 100 is described according to the flowchart in FIG. 10.

First, at S1, to grasp the operating state of the engine 2 after being started, the detection information is read from the various sensors to detect the engine load, the engine speed, the oil temperature, and the like.

Subsequently, at S2, the duty ratio maps stored in the controller 100 in advance are read, and the target duty ratio is read according to the engine load, the engine speed, and the oil temperature read at Step S1.

Following S2, at S3, whether a current duty ratio matches with the target duty ratio read at S2 is determined. If the determination result at S3 is positive, the control proceeds to S5. On the other hand, if the determination result at S3 is negative, the control proceeds to S4 in which a signal indicating the target duty ratio is outputted to the linear solenoid valve 49 (described as "the flow rate control valve" in the flowchart of FIG. 10), and then the control proceeds to S5.

At S5, the current oil pressure is read by the oil pressure sensor 70, and next, at S6, the oil pressure control map stored in advance is read and the target oil pressure according to the current operating state of the engine is read from the oil pressure control map.

Following S6, at S7, whether the current oil pressure matches with the target oil pressure read at S6 is determined. If the determination result at S7 is negative, the control proceeds to S8 in which an output signal indicating the target duty ratio after being changed by a predetermined rate is outputted to the linear solenoid valve 49, and then the control returns back to S5. Specifically, the discharge amount of the oil pump 36 is controlled so that the oil pressure detected by the oil pressure sensor 70 becomes the target oil pressure.

On the other hand, if the determination result at S7 is positive, the control proceeds to S9 in which the engine load, the engine speed, and the oil temperature are detected, and next, at S10, whether the engine load, the engine speed, and the oil temperature are changed is determined.

If the determination result at S10 is positive, the control returns back to S2, but if the determination result at S10 is negative, the control returns back to S5. Note that the flow rate control described above is continued until the engine 2 is stopped.

The flow rate control of the oil pump 36 described above corresponds to a combination of a feedforward control of the duty ratio and a feedback control of the oil pressure, and by the flow rate control, an improvement of responsiveness by the feedforward control and an improvement of accuracy by the feedback control are achieved.

Subsequently, a cylinder-number control performed by the controller 100 is described according to the flowchart in FIG. 11.

First, at S11, to grasp the operating state of the engine 2 after being started, the detection information is read by the various sensors to detect the engine load, the engine speed, the coolant temperature, and the like.

Following S11, at S12, whether the current operating state of the engine satisfies valve stop conditions (is within the reduced-cylinder operating range) is determined based on the engine load, the engine speed, and the coolant temperature which are read.

If the determination result at S12 is negative, the control proceeds to S13 in which the four-cylinder operation (all-cylinder operation) is performed.

On the other hand, if the determination result at S12 is positive, the control proceeds to S14 in which the first direction switch valves 34 and 35 which respectively lead to the VVTs 32 and 33 are operated and next, at S15, current cam angles are read from the cam angle sensors 74.

Following S11, at S16, whether current operational angles for the VVTs 32 and 33 corresponding to the read current cam angles are target operational angles is determined.

If the determination result at S16 is negative, the control returns back to S15. Specifically, the operations of the second direction switch valves 46 and 47 are prohibited until the current operational angles become the target operational angles.

If the determination result at S16 is positive, the control proceeds to S17 in which the second direction switch valves 46 and 47 are operated and the dual-cylinder operation (reduced-cylinder operation) is performed.

Figure 11:
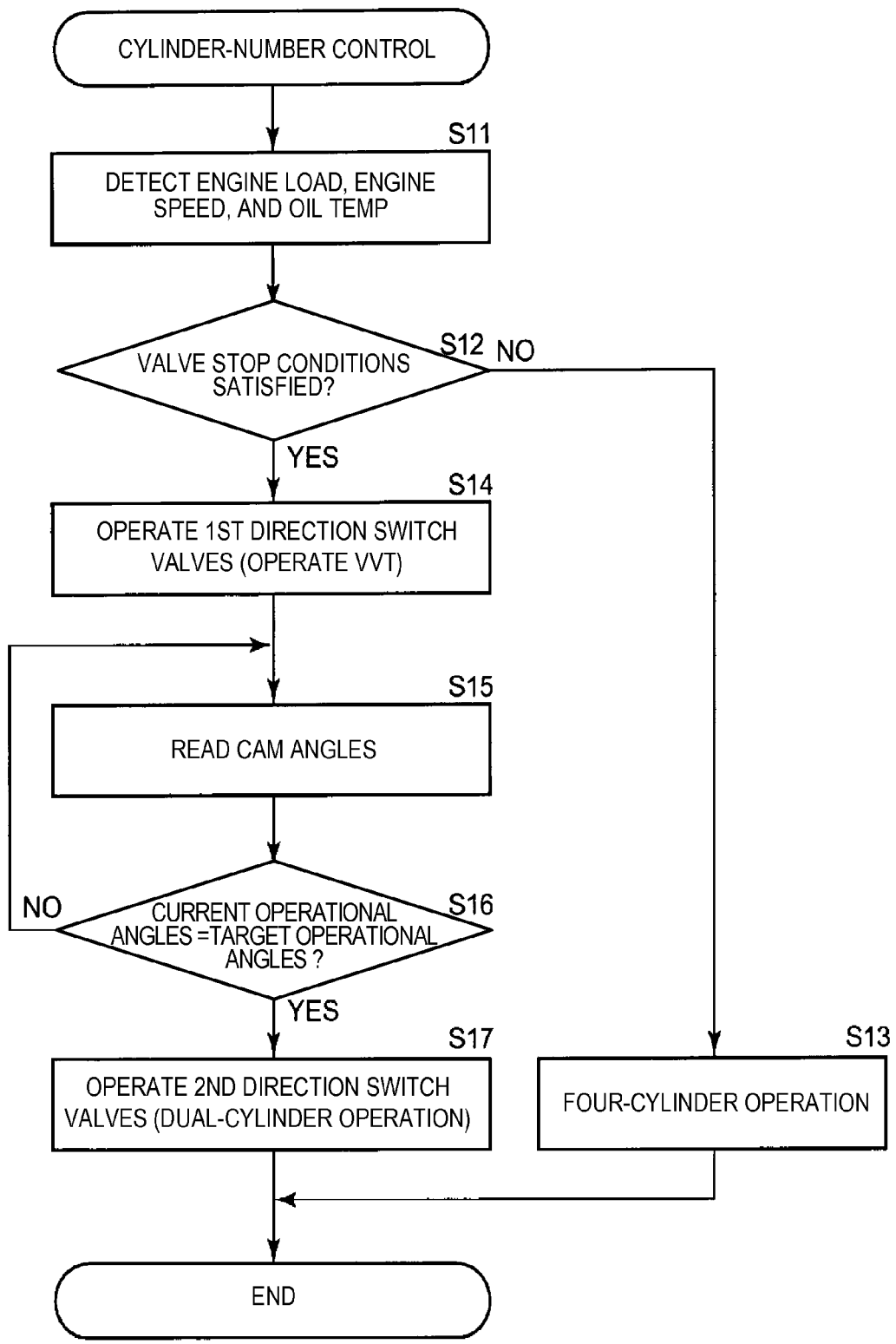
FIG. 11 is a flowchart illustrating an operation of a cylinder-number control of the engine by the controller.
Figure 12:
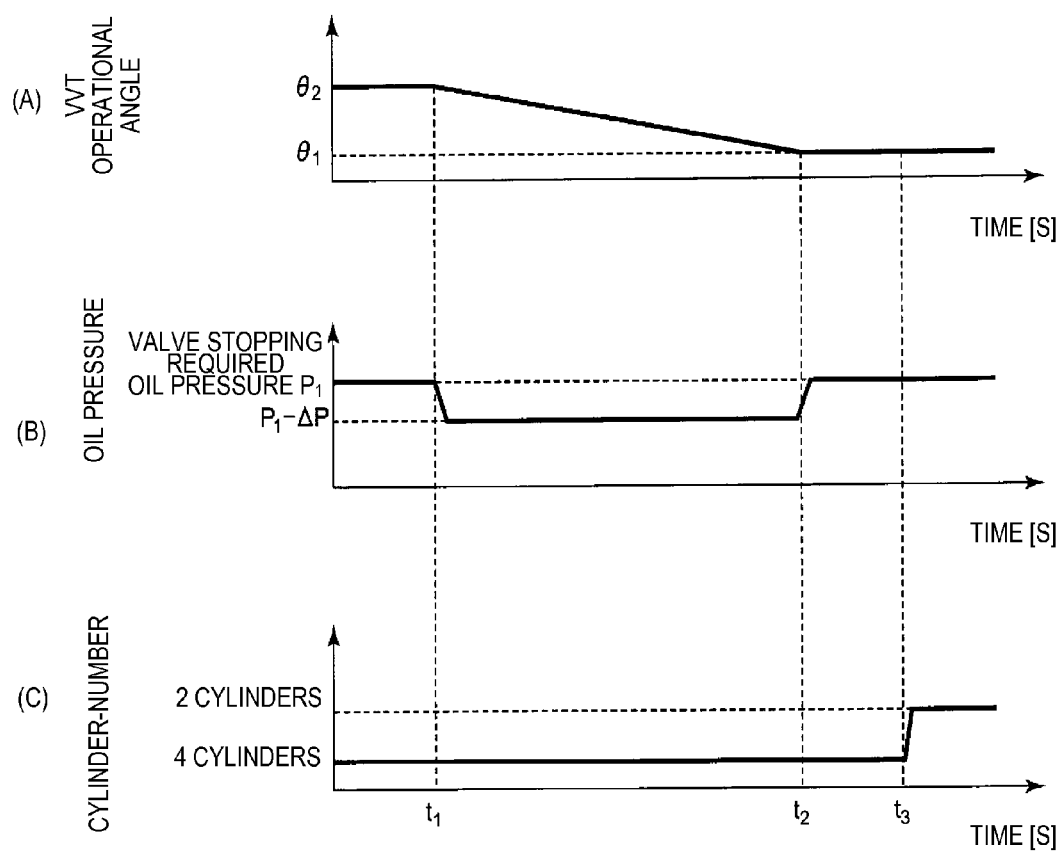
FIG. 12 shows time charts illustrating the operating state of the engine while switching from an all-cylinder operation to a reduced-cylinder operation.

Next, with reference to FIG. 12, a specific example is described, in which the cylinder-number control illustrated in FIG. 11 is performed when the VVT 32 (here, only the VVT 32 of the VVTs 32 and 33) is operated while the reduced-cylinder operation is requested immediately after the operating state of the engine 2 enters the reduced-cylinder operating range.

At a timing t1, the first direction switch valve 34 for the VVT 32 is operated. Thus, the oil supply to the advance-side oil pressure chamber 32b of the VVT 32 is started and the operational angle of the VVT 32 is changed from θ2 toward θ1. Thus, the oil pressure is reduced to below the valve stopping required oil pressure P1.

Here, when the current operating state of the engine 2 enters the reduced-cylinder operating range and the valve stopping conditions are satisfied, until the operational angle of the VVT 32 reaches the target operational angle θ1 by continuing the operation of the VVT 32, in other words, while the oil pressure is lower than the valve stopping required oil pressure P1, the valve stopping mechanism 25b is not operated.

At a timing t2, when the operational angle of the VVT 32 reaches the target operational angle θ1 and the operation of the VVT 32 is completed, the oil supply to the advance-side oil pressure chamber 32b of the VVT 32 ends, and therefore, the oil pressure returns back to the valve stopping required oil pressure P1.

At a timing t3 after the timing t2 when the oil pressure returns back to the valve stopping required oil pressure P1, the second direction switch valves 46 and 47 are operated, the oil pressure is supplied to the valve stopping mechanism 25b, and the operation of the engine is switched from the four-cylinder operation to the dual-cylinder operation. Since the operation of the engine is shifted to the reduced-cylinder (dual-cylinder) operation after the VVT 32 is controlled to advance as described above, the advancing control of the intake and exhaust valves 14 and 15 increases an air fill amount and the two cylinders bear the engine load; thus, the rotational fluctuation of the engine 2 can be suppressed.

The one-way valve 48 is biased by a spring so as to open when the oil pressure within the third communicating path 53 exceeds the required oil pressure of the valve stopping mechanism 25b, and thus, the one-way valve 48 regulates the oil flow to only one direction of upstream to downstream. Moreover, the one-way valve 48 is opened by an oil pressure larger than the required oil pressures of the VVTs 32 and 33.

When the VVTs 32 and 33 are operated during the reduced-cylinder operation in which the valve stopping mechanism 25b is operated, although the oil pressure within the third communicating path 53 is reduced, since the flow of the oil from the valve stopping mechanism 25b to the third communicating path 53 provided upstream of the one-way valve 48 is blocked by the one-way valve 48 provided in the oil path 69, the required oil pressure of the valve stopping mechanism 25b on the downstream side of the one-way valve 48 is secured. Therefore, malfunction of the valve stopping mechanism 25b due to a reduction of the oil pressure of the third communicating path 53 can be prevented.

As described above, in the low engine load state where the engine load is lower than the predetermined value (e.g., in idling), similarly to the high engine load state, the open periods of the intake and exhaust valves 14 and 15 are overlapped with each other. Moreover, in the low engine load state (in this embodiment, when the engine speed is lower than the predetermined speed V1), the all-cylinder operation is performed. Note that it may be such that the all-cylinder operation is performed regardless of the engine speed as long as the engine is in the low engine load state.

As the valve overlapping amount in the low engine load state becomes large, the internal EGR amount becomes relatively large with respect to the fresh air amount within each cylinder of the engine 2 and the combustion stability degrades. Therefore, the valve overlapping amount in the low engine load state is set as large as possible within the extent that the combustion stability can be secured, and when the valve overlapping amount in the low engine load state becomes larger than the set value, a possibility arises that the combustion stability degrades.

Here, in this embodiment, the valve stopping mechanism 25b for stopping the operations of the intake and exhaust valves 14 and 15 of the first and fourth cylinders according to the operating state of the engine 2 is provided. In the valve stopping mechanism 25b, the clearance cannot be prevented from occurring between the penetrating hole 251a of the outer cylinder 251 and the lock pin 252 by any means, and the clearance varies depending on a manufacturing error. Considering the clearance, the valve lifts in periods of ramp parts of cam lift properties of the intake and exhaust valves 14 and 15 of the first and fourth cylinders need to be larger than those of the second and third cylinders. When the valve lifts in the periods of the ramp parts of the cam lift properties of the intake and exhaust valves 14 and 15 of the first and fourth cylinders are increased as described above, the valve overlapping amounts of the first and fourth cylinders in the low engine load state become larger than the valve overlapping amounts of the second and third cylinders in the low engine load state. Therefore, even if the valve overlapping amounts of the second and third cylinders in the low engine load state are set as large as possible within the extent that the combustion stability can be secured as described above, the valve overlapping amounts of the first and fourth cylinders in the low engine load state become larger than the largest possible value, and therefore, the combustion stability degrades within the first and fourth cylinders and there is a possibility that the engine torque varies.

Thus, in this embodiment, the controller 100 detects an angular speed variation of the crankshaft 9 (obtained by subtracting the minimum value of the angular speed of the crankshaft 9 from the maximum value thereof) based on the rotational angle of the crankshaft 9 obtained from the crank angle sensor 71. In the all-cylinder operation in which the valve operation is not stopped by the valve stopping mechanism 25b while in the low engine load state, when the detected angular speed variation is larger than a predetermined threshold, an auxiliary component drive load increase control is performed in which a current total drive load of first and second auxiliary components driven by the engine 2 (there is also a case where the current drive load of at least one of the auxiliary components is zero) is increased by a predetermined amount so that the angular speed variation becomes lower than the predetermined threshold. The first auxiliary component can generate a required energy (power) of devices (a battery and an electric component) installed in the vehicle, and in this embodiment, it is the alternator 81 that can generate power as the required energy; however, it may be other than the alternator 81 as long the drive load thereof can be controlled and the required energy can be generated thereby. In this embodiment, the second auxiliary component is the oil pump 36 for supplying the oil via the oil pressure path to the lubricated parts of the engine 2 and the hydraulically-actuated devices; however, it may be other than the oil pump 36 as long as the drive load thereof can be controlled. The predetermined threshold is set to a value at which a person in the vehicle in which the engine 2 is installed would feel uncomfortable due to the engine vibration caused by the angular speed variation.

In this embodiment, the crank angle sensor 71 and the controller 100 configure an angular speed variation detecting device for detecting the angular speed variation of the crankshaft 9. Note that by providing, for each cylinder, a pressure sensor for detecting the pressure within each cylinder (combustion chamber 11), the controller 100 may detect the angular speed variation of the crankshaft 9 based on the combustion pressures of the respective cylinders from the pressure sensors. In this case, the pressure sensors and the controller 100 configure the angular speed variation detecting device.

In the auxiliary component drive load increase control, the total increase amount of the drive loads of the first and second auxiliary components (i.e., the predetermined amount) is an amount with which the engine load that can suppress the angular speed variation to below the predetermined threshold can be obtained, and also is an amount based on the angular speed variation. Note that the increase amount may be fixed regardless of the angular speed variation.

Specifically, when the auxiliary component drive load is increased, the engine load is increased; thus, the intake air amount is increased, the fresh air amount with respect to the internal EGR amount is increased in each cylinder, and the fuel injection amount is increased. Therefore, the combustion stability improves in all the cylinders including the first and fourth cylinders, and as result, the variation of the engine torque (angular speed variation) is suppressed.

In the auxiliary component drive load increase control, when increasing the drive load of the oil pump 36, the discharge amount of the oil pump 36 is increased. Specifically, in the all-cylinder operation under the low engine load state, when the angular speed variation is larger than the predetermined threshold, the target oil pressure is increased with respect to the current target oil pressure to increase the discharge amount of the oil pump 36 with respect to the current discharge amount. When the angular speed variation is lower than the predetermined threshold, the target oil pressure is set to be based on the oil pressure control map, whereas when the angular speed variation is larger than the predetermined threshold, the target oil pressure is larger than that based on the oil pressure control map. The increase amount of the target oil pressure is set based on the oil temperature. Specifically, as the oil temperature becomes low, the viscosity of the oil is increased and the drive load of the oil pump 36 is increased, and therefore, accordingly, the increase amount of the discharge amount becomes less, resulting in a smaller increase amount of the target oil pressure.

In this embodiment, in the auxiliary component drive load increase control, when the controller 100 increases the total drive load of the first and second auxiliary components from the current total drive load, in a state where the drive load of the alternator 81 is increasable, the controller 100 increases the drive load of the alternator 81 and adjusts the increase amount of the discharge amount of the oil pump 36 (the increase amount of the target oil pressure) by the increase amount of the drive load of the alternator 81. Specifically, in the state where the drive load of the alternator 81 is increasable, the drive load of the alternator 81 is preferentially increased (when the alternator 81 is not in the generating state and the state is changed to the generating state, the generated power is increased from zero, and when the alternator 81 is in the generating state, the generated power is increased), and when the increase amount of the drive load of the alternator 81 can cover the predetermined amount, the discharge amount of the oil pump 36 is not increased (the increase amount of the discharge amount is set to zero). Moreover, when the increase amount of the drive load of the alternator 81 is not enough to cover the predetermined amount, the discharge amount of the oil pump 36 is increased and the increase amount of the drive load in relation to the increase of the discharge amount is set to the amount obtained by subtracting the increase amount of the drive load of the alternator 81 from the predetermined amount (to the increase amount of the target oil pressure corresponding to the obtained amount). The phrase "in the state where the drive load of the alternator 81 is increasable" indicates a state in which the generated power is increasable according to the increase of the drive load and the increasable generated power can be charged in a battery installed in the vehicle or be used in an electric component installed in the vehicle. When the state of charge (SOC) of the battery is either one of a fully charged state and a state close thereto and the increasable generated power cannot be used in the electric component, the drive load of the alternator 81 cannot be increased. In this case, the drive load of the alternator 81 is not increased (the increase amount of the drive load of the alternator 81 is set to zero) and the discharge amount of the oil pump 36 (the drive load of the oil pump 36) is increased.

Figure 13:
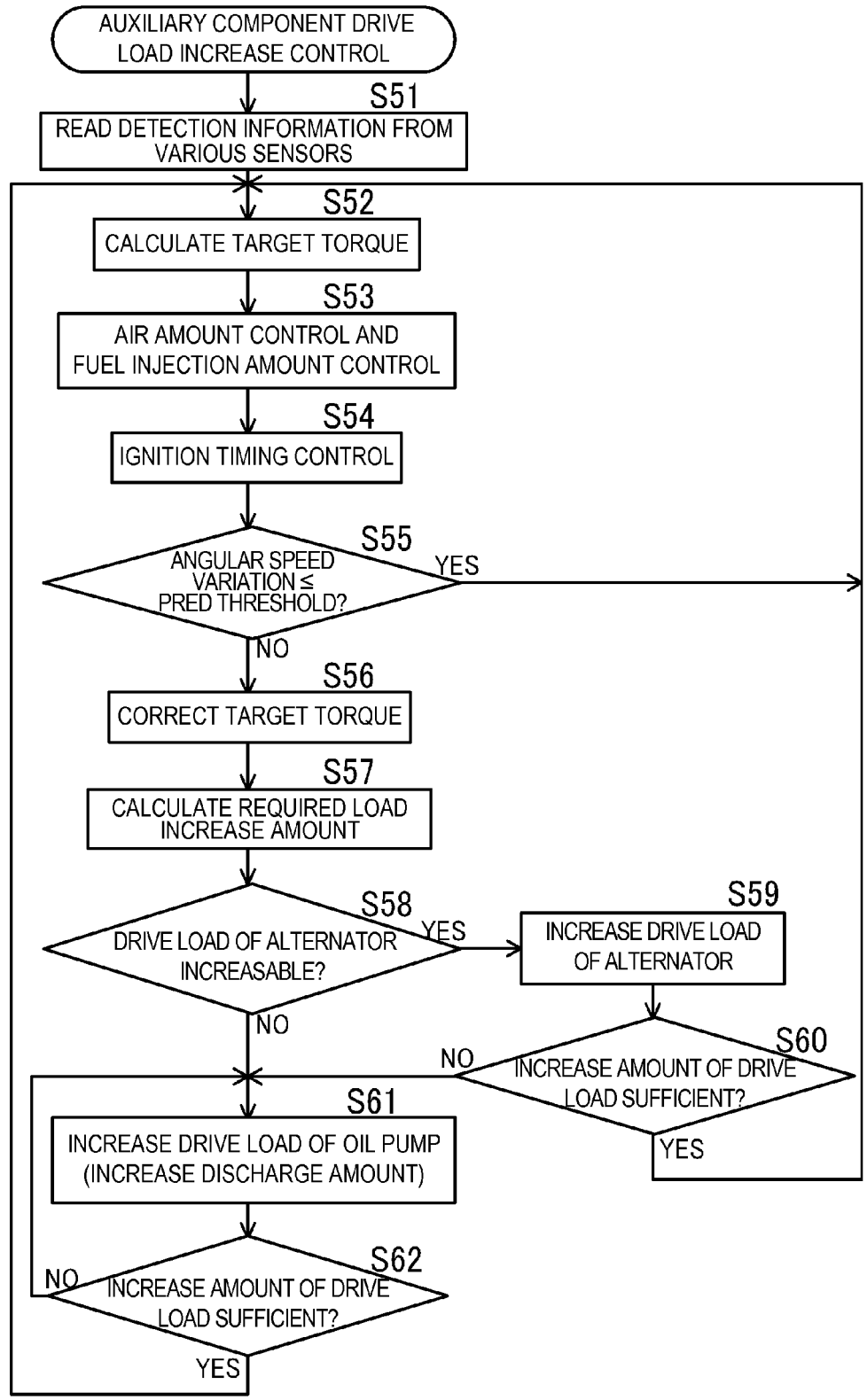
FIG. 13 is a flowchart illustrating an operation of an auxiliary component drive load increase control by the controller.

Here, the auxiliary component drive load increase control performed by the controller 100 is described with reference to the flowchart in FIG. 13. Note that the auxiliary component drive load increase control is started when the operating state of the engine 2 is out of the reduced-cylinder operating range and the reduced-cylinder operation preparing range, and the engine load becomes lower than the predetermined value.

At S51, the detection information is read from the various sensors to detect the engine load (accelerator opening), the engine speed, the angular speed variation of the crankshaft 9, and the coolant temperature, and next, at S52, the target torque of the engine 2 is calculated.

Following S52, at S53, an air amount control by a throttle valve and the VVTs 32 and 33 and a fuel injection amount control by fuel injection valves are performed according to the target torque, and next, at S54, an ignition timing control is performed by ignition plugs.

At S55, whether the angular speed variation of the crankshaft 9 is lower than the predetermined threshold is determined. If the determination result at S55 is positive, the control returns back to S52, whereas if the determination result at S55 is negative, the control proceeds to S56.

At S56, the target torque is corrected. In other words, the target torque is increased larger than the current target torque. Specifically, the target torque is increased to the torque that can suppress the angular speed variation lower than the predetermined threshold, according to the angular speed variation. Note that regardless of the angular speed variation, the target torque may be increased by adding a predetermined torque to the current target torque.

Following S56, at S57, a load increase amount (corresponding to the predetermined amount) required for the correction of the target torque is calculated, and next, at S58, whether the drive load of the alternator 81 is increasable is determined. If the determination result at S58 is positive, the control proceeds to S59, whereas if the determination result at S58 is negative, the control proceeds to S61.

At S59, the drive load of the alternator 81 is increased. Here, in a case where there is a regulation to the increase amount of the power generated by the alternator 81 due to, for example, the SOC of the battery and the usage state of the electric component, when the drive load increase amount corresponding to the regulated generated power increase amount is smaller than the required load increase amount, the drive load increase amount is set to correspond to the regulated generated power increase amount, and when there is not such regulation or there is a regulation but the drive load increase amount corresponding to the regulated generated power increase amount is larger than the required load increase amount, the drive load increase amount is set to correspond to the required load increase amount.

Following S59, at S60, whether the increase amount of the drive load of the alternator 81 is sufficient with respect to (is larger than) the required load increase amount is determined. If the determination result at S60 is positive, the drive load of the oil pump 36 is not increased and the control returns back to S52, whereas when the determination result at S60 is negative, the control proceeds to S61.

At S61, which the control proceeds to when the result of the determination at either one of S58 and S60 is negative, the drive load (discharge amount) of the oil pump 36 is increased. Specifically, when the drive load of the alternator 81 cannot be increased (S58: NO), the increase amount of the drive load of the oil pump 36 is set to the required load increase amount, whereas when the drive load of the alternator 81 is increased but the increase amount of the drive load of the alternator 81 is not enough to cover the required load increase amount (S60: NO), the increase amount of the drive load of the alternator 81 is set to a value obtained by subtracting the increase amount of the drive load of the alternator 81 from the required load increase amount.

Next, at S62, whether the increase amount of the drive load of the oil pump 36 is sufficient with respect to (is higher than) the value obtained by subtracting the increase amount of the drive load of the alternator 81 from the required load increase amount is determined. If the determination result at S62 is positive, the control returns back to S52, whereas if the determination result at S62 is negative, the control returns back to S61. Note that the auxiliary component drive load increase control ends when the operating state of the engine 2 enters the reduced-cylinder operating range or the engine load becomes higher than the predetermined value.

Therefore, in this embodiment, when the angular speed variation of the crankshaft 9 is larger than the predetermined threshold, the total drive load of the first auxiliary component (alternator 81) and the second auxiliary component (oil pump 36) driven by the engine 2 is increased from the current total drive load so that the angular speed variation becomes lower than the predetermined threshold. When increasing the total drive load of the first and second auxiliary components from the current total drive load by the predetermined amount, in the state where the drive load of the first auxiliary component is increasable, the drive load of the first auxiliary component is preferentially increased, and when the increase amount of the drive load of the first auxiliary component is not enough to cover the predetermined amount, the drive load of the second auxiliary component is increased. In the state where the drive load of the first auxiliary component is not increasable, the drive load of the second auxiliary component is increased without increasing the drive load of the first auxiliary component. Thus, even if the valve overlapping amounts of the first and fourth cylinders in the low engine load state become larger than those of the second and third cylinders in the low engine load state due to providing the valve stopping mechanism 25b, the combustion stability can be improved in all the cylinders including the specific cylinders, and thus, in the all-cylinder operation under the low engine load state, the variation of the engine torque can be suppressed and the engine vibration caused by the variation can be reduced.

Moreover, when increasing the total drive load of the first and second auxiliary components from the current total drive load by the predetermined amount, since the drive load of the first auxiliary component is preferentially increased in the state where the drive load of the first auxiliary component is increasable, the engine output can be effectively utilized as an energy source of the devices installed in the vehicle. Therefore, the degradation of the fuel consumption caused by suppressing the engine torque variation can be suppressed as much as possible.

The present invention is not limited to this embodiment, and may be modified without deviating from the scope of the claims.

For example, in this embodiment, the locking mechanism of the valve stopping device is provided to the HLA 25 to switch the state of the pivot mechanism 25a between the locked state and the unlocked state; however, it may be modified in any form as long as the operations of the intake and exhaust valves 14 and 15 can be stopped. For example, the switch may be performed between a state where the cam followers 20a and 21a are respectively coupled to the swing arms 20 and 21 and the swing arms 20 and 21 swing centering on the top portions of the pivot mechanisms 25a when the cam followers 20a and 21a are respectively pushed downward by the cam parts 18a and 19a, and a state where the cam followers 20a and 21a are respectively not coupled to the swing arms 20 and 21 and the swing arms 20 and 21 do not swing even when the cam followers 20a and 21a are pushed downward.

Moreover, in this embodiment, also in the low engine load state, similarly to other than the low engine load state, the open periods of the intake and exhaust valves 14 and 15 are overlapped with each other; however, it may be such that the open periods are overlapped in other than the low engine load state and they are not overlapped in the low engine load state. Even with such a configuration, by providing the valve stopping mechanism 25b (locking mechanism) only to the specific cylinders which are the part of all the cylinders (the number of the specific cylinders is not limited as long as it is less than all the cylinders), especially when the total operating time length of the engine 2 becomes long, the valve open-close properties easily become different between the specific cylinders and the other cylinders, and thus, there is a possibility that the engine torque varies. However, by performing the auxiliary component drive load increase control, the engine load can be increased, the variation of the engine torque can be suppressed, and the engine vibration caused by the variation can be reduced. Further, even in a case where the locking mechanism of the valve stopping device is not provided, when the total operation time period of the engine 2 becomes long, in the low engine load state, there is a possibility that the engine torque varies due to variations in performance of the ignition system and the fuel supply system of each cylinder and the valve operating system. However, by performing the auxiliary component drive load increase control, the engine torque variation can be suppressed. When performing the auxiliary component drive load increase control, by preferentially increasing the drive load of the first auxiliary component, the degradation of the fuel consumption caused by suppressing the engine torque variation can be suppressed as much as possible.

Moreover, in this embodiment, the engine 2 is an in-line four-cylinder gasoline engine; however, it may be any kind of engine, for example, a diesel engine, as long as it is a multi-cylinder engine.

The above-described embodiment is merely an illustration, and therefore, the scope of the present invention must not be interpreted in a limited way thereby. The scope of the present invention is defined by the following claims, and all of modifications and changes falling under the equivalent range of the claims are within the scope of the present invention.

The present invention is useful for method and device for controlling a multi-cylinder engine including first and second auxiliary components driven by the multi-cylinder engine installed in a vehicle.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE CHARACTERS

2 Multi-cylinder Engine
14 Intake Valve
15 Exhaust Valve
25*b* Valve Stopping Mechanism (Locking Mechanism of Hydraulically-actuated Valve Stopping Device) (Hydraulically-actuated Device)
32 Intake-side Variable Valve Timing Mechanism (Hydraulically-actuated Device)
33 Exhaust-side Variable Valve Timing Mechanism (Hydraulically-actuated Device)
36 Variable Displacement Oil Pump (Auxiliary Component)
70 Oil pressure sensor (Oil Pressure Detecting Device)
71 Crank Angle Sensor (Angular Speed Variation Detecting Device)
73 Oil temperature Sensor (Oil temperature Detecting Device)
81 Alternator (Generator) (Auxiliary Component)
100 Controller (Auxiliary Component Control Device) (Pump Control Device) (Angular Speed Variation Detecting Device)

What is claimed is:

1. A control device of a multi-cylinder engine, the control device including first and second auxiliary components driven by torque from a crankshaft of the multi-cylinder engine installed in a vehicle,
    wherein the first auxiliary component is an alternator that generates a required energy of a device installed in the vehicle,
    wherein the control device of the multi-cylinder engine comprises:
        an angular speed variation detecting device for detecting an angular speed variation of a crankshaft of the engine; and
        an auxiliary component control device for controlling drive loads of the first and second auxiliary components,
    wherein, when an engine load is lower than a predetermined value and the angular speed variation detected by the angular speed variation detecting device exceeds a predetermined threshold, the auxiliary component control device performs an auxiliary component drive load increase control in which a total drive load of the first and second auxiliary components is increased by a predetermined amount to reduce the angular speed variation to be lower than the predetermined threshold,
    wherein in the auxiliary component drive load increase control, when increasing the total drive load of the first and second auxiliary components by the predetermined amount, in a state where the drive load of the first auxiliary component is increasable, the drive load of the first auxiliary component is preferentially increased, and when the increase amount of the drive load of the first auxiliary component is insufficient to cover the predetermined amount, the drive load of the second auxiliary component is increased, whereas in a state where the drive load of the first auxiliary component is not increasable, the drive load of the second auxiliary component is increased without increasing the drive load of the first auxiliary component,
    wherein the state where the drive load of the first auxiliary component is not increasable is when a required load increase amount for torque increase of the crankshaft is calculated, and the required load increase amount is greater than a regulated generated power increase amount of the alternator that is configured according to a usage state of electrical components and/or SOC of batteries.

2. The control device of the multi-cylinder engine of claim 1, wherein the second auxiliary component is a variable displacement oil pump for supplying oil to a part of the engine to be lubricated and a hydraulically-actuated device via a hydraulic path.

3. The control device of the multi-cylinder engine of claim 2, further comprising an oil pressure detecting device for detecting an oil pressure within the hydraulic path,
    wherein the auxiliary component control device includes a pump control device for controlling a discharge amount of the oil pump so that the oil pressure detected by the oil pressure detecting device reaches a target oil pressure predetermined according to the operating state of the engine.

* * * * *